United States Patent
Mukherjee et al.

(10) Patent No.: US 10,579,721 B2
(45) Date of Patent: Mar. 3, 2020

(54) LEAN PARSING: A NATURAL LANGUAGE PROCESSING SYSTEM AND METHOD FOR PARSING DOMAIN-SPECIFIC LANGUAGES

(71) Applicant: Intuit Inc., Mountain View, CA (US)

(72) Inventors: Saikat Mukherjee, Fremont, CA (US); Esmé Manandise, Tallahassee, FL (US); Sudhir Agarwal, Palo Alto, CA (US); Karpaga Ganesh Patchirajan, Plano, TX (US)

(73) Assignee: Intuit Inc., Mountain View, CA (US)

( * ) Notice: Subject to any disclaimer, the term of this patent is extended or adjusted under 35 U.S.C. 154(b) by 239 days.

(21) Appl. No.: 15/713,161

(22) Filed: Sep. 22, 2017

(65) Prior Publication Data
US 2018/0032497 A1    Feb. 1, 2018

Related U.S. Application Data

(63) Continuation-in-part of application No. 15/606,370, filed on May 26, 2017, which is a continuation-in-part
(Continued)

(51) Int. Cl.
*G06Q 40/00* (2012.01)
*G06F 17/24* (2006.01)
(Continued)

(52) U.S. Cl.
CPC .......... *G06F 17/243* (2013.01); *G06F 17/274* (2013.01); *G06F 17/2705* (2013.01);
(Continued)

(58) Field of Classification Search
CPC ............... G06F 17/2785; G06F 17/271; G06F 16/3329; G06F 16/84; G06F 17/243; G06Q 40/123
See application file for complete search history.

(56) References Cited

U.S. PATENT DOCUMENTS

| 6,912,536 B1 | 6/2005 | Ochitani |
| 7,092,922 B2 | 8/2006 | Meng et al. |

(Continued)

FOREIGN PATENT DOCUMENTS

| JP | 2013-164740 | 8/2013 |
| KR | 10-1585029 | 1/2016 |
| WO | WO 2009-061917 | 5/2009 |

OTHER PUBLICATIONS

Hermens, Leonard A., et al., "A Machine-Learning Apprentice for the Completion of Repetitive Forms," Feb. 1994, IEEE, pp. 28-33.
(Continued)

*Primary Examiner* — Hao Fu
(74) *Attorney, Agent, or Firm* — Paradice and Li LLP

(57) ABSTRACT

A method and system parses natural language in a unique way, determining important words pertaining to a text corpus of a particular genre, such as tax preparation. Sentences extracted from instructions or forms pertaining to tax preparation, for example are parsed to determine word groups forming various parts of speech, and then are processed to exclude words on an exclusion list and word groups that don't meet predetermined criteria. From the resulting data, synonyms are replaced with a common functional operator and the resulting sentence text is analyzed against predetermined patterns to determine one or more functions to be used in a document preparation system.

28 Claims, 4 Drawing Sheets

Related U.S. Application Data of application No. 15/488,052, filed on Apr. 14, 2017, which is a continuation-in-part of application No. 15/293,553, filed on Oct. 14, 2016, which is a continuation-in-part of application No. 15/292,510, filed on Oct. 13, 2016, now Pat. No. 10,140,277.

(60) Provisional application No. 62/362,688, filed on Jul. 15, 2016.

(51) Int. Cl.
*G06F 17/27* (2006.01)
*G06Q 10/10* (2012.01)
*G06K 9/00* (2006.01)

(52) U.S. Cl.
CPC ........ *G06F 17/277* (2013.01); *G06F 17/2785* (2013.01); *G06F 17/2795* (2013.01); *G06K 9/00469* (2013.01); *G06Q 10/10* (2013.01); *G06Q 40/123* (2013.12)

(56) References Cited

U.S. PATENT DOCUMENTS

| | | |
|---|---|---|
| 7,234,103 B1 | 6/2007 | Regan |
| 7,254,569 B2 | 8/2007 | Goodman et al. |
| 7,343,551 B1 | 3/2008 | Bourdev |
| 7,500,178 B1 | 3/2009 | O'Donnell |
| 7,561,734 B1 | 7/2009 | Wnek |
| 7,765,097 B1 | 7/2010 | Yu et al. |
| 8,032,822 B1 | 10/2011 | Artamonov et al. |
| 8,082,144 B1 | 12/2011 | Brown et al. |
| 8,214,362 B1 | 7/2012 | Djabarov |
| 8,370,143 B1 | 2/2013 | Coker |
| 8,655,695 B1 | 2/2014 | Qu et al. |
| 8,756,489 B2 | 6/2014 | Richardt et al. |
| 9,069,745 B2 | 6/2015 | Jacobsen et al. |
| 9,430,453 B1 | 8/2016 | Ho |
| 9,652,562 B2 | 5/2017 | Barrus |
| 9,892,106 B1 | 2/2018 | Lesner et al. |
| 2002/0083068 A1 | 6/2002 | Quass et al. |
| 2003/0026459 A1 | 2/2003 | Won et al. |
| 2003/0233296 A1 | 12/2003 | Wagner |
| 2004/0039988 A1 | 2/2004 | Lee et al. |
| 2005/0108406 A1 | 5/2005 | Lee et al. |
| 2005/0125746 A1 | 6/2005 | Viola et al. |
| 2005/0257148 A1 | 11/2005 | Goodman et al. |
| 2005/0267869 A1 | 12/2005 | Horvitz et al. |
| 2006/0062451 A1 | 3/2006 | Li et al. |
| 2006/0111990 A1 | 5/2006 | Cohen et al. |
| 2006/0155539 A1 | 7/2006 | Chen et al. |
| 2006/0178961 A1 | 8/2006 | Stanley et al. |
| 2006/0184870 A1 | 8/2006 | Christen et al. |
| 2006/0242180 A1 | 10/2006 | Graf et al. |
| 2007/0130134 A1 | 6/2007 | Ramsey et al. |
| 2008/0065634 A1 | 3/2008 | Krinsky |
| 2008/0104506 A1 | 5/2008 | Farzindar |
| 2008/0147528 A1 | 6/2008 | Talan et al. |
| 2008/0154824 A1 | 6/2008 | Weir et al. |
| 2008/0227075 A1 | 9/2008 | Poor et al. |
| 2008/0313174 A1 | 12/2008 | Barve et al. |
| 2009/0089046 A1 | 4/2009 | Uchimoto et al. |
| 2009/0119107 A1 | 5/2009 | Duncan |
| 2009/0204881 A1 | 8/2009 | Murthy et al. |
| 2009/0276729 A1 | 11/2009 | Cantu-Paz |
| 2009/0327513 A1 | 12/2009 | Guo et al. |
| 2010/0005096 A1 | 1/2010 | Minagawa et al. |
| 2011/0087671 A1 | 4/2011 | Lee et al. |
| 2011/0258182 A1 | 10/2011 | Singh et al. |
| 2011/0271173 A1 | 11/2011 | Ait-Mokhtar et al. |
| 2012/0089659 A1 | 4/2012 | Halevi et al. |
| 2012/0272160 A1 | 10/2012 | Spivack et al. |
| 2013/0013612 A1 | 1/2013 | Fittges et al. |
| 2014/0019433 A1 | 1/2014 | Effrat et al. |
| 2014/0122988 A1 | 5/2014 | Eigner et al. |
| 2014/0173406 A1 | 6/2014 | Robelin et al. |
| 2014/0207782 A1 | 7/2014 | Ravid |
| 2014/0223277 A1 | 8/2014 | Kimber et al. |
| 2014/0258825 A1 | 9/2014 | Ghosh et al. |
| 2015/0046785 A1 | 2/2015 | Byron et al. |
| 2015/0095753 A1 | 4/2015 | Gajera et al. |
| 2015/0206067 A1 | 7/2015 | Abu-Mostafa et al. |
| 2015/0254225 A1 | 9/2015 | Chirca |
| 2015/0317295 A1 | 11/2015 | Sherry et al. |
| 2016/0019197 A1 | 1/2016 | Iasi et al. |
| 2017/0075873 A1 | 3/2017 | Shetty et al. |
| 2017/0220540 A1 | 8/2017 | Wang et al. |
| 2017/0239576 A1* | 8/2017 | Hsiao ..................... A63F 13/63 |
| 2017/0293607 A1* | 10/2017 | Kolotienko ......... G06F 17/2725 |
| 2018/0018310 A1 | 1/2018 | Unsal |
| 2018/0018311 A1 | 1/2018 | Mukherjee et al. |
| 2018/0018322 A1 | 1/2018 | Mukherjee et al. |
| 2018/0018582 A1 | 1/2018 | Unsal et al. |
| 2018/0018676 A1 | 1/2018 | Mukherjee et al. |
| 2018/0018740 A1 | 1/2018 | Unsal et al. |
| 2018/0018741 A1 | 1/2018 | Mukherjee et al. |
| 2018/0053120 A1 | 2/2018 | Mukherjee et al. |
| 2018/0121337 A1 | 5/2018 | Unsal et al. |

OTHER PUBLICATIONS

Zhang, Chi, "Genetic Programming for Symbolic Regression," 2015, University of Tennessee, Knoxville, TN 37966, USA.

Glushko, Robert J., et al., "Document Engineering for e-Business," DocEng '02, Nov. 2002, USA, copyright 2002 ACM, p. 42-48.

Research Gate, "Thread of Question and Answers on generating training set data from ResearchGate," retrieved from https://www.researchgate.net/post/How_can_1_Generate_the_training_data_From_the_dataset_of_images, Questions and Answers dated Jul. 2015, pp. 1-5 (Year: 2015).

* cited by examiner

LEAN PARSING: A NATURAL LANGUAGE PROCESSING SYSTEM AND METHOD FOR PARSING DOMAIN-SPECIFIC LANGUAGES

RELATED CASES

This application is a continuation-in-part of co-pending and commonly owned U.S. patent application Ser. No. 15/606,370, filed May 26, 2017, entitled "SYSTEM AND METHOD FOR AUTOMATICALLY UNDERSTANDING LINES OF COMPLIANCE FORMS THROUGH NATURAL LANGUAGE PATTERNS," which in turn is a continuation-in-part of co-pending and commonly owned U.S. patent application Ser. No. 15/488,052, filed Apr. 14, 2017, entitled "METHOD AND SYSTEM FOR AUTOMATICALLY EXTRACTING RELEVANT TAX TERMS FROM FORMS AND INSTRUCTIONS," which in turn is a continuation-in-part of co-pending and commonly owned U.S. patent application Ser. No. 15/293,553, filed Oct. 14, 2016, entitled "SYSTEM AND METHOD FOR AUTOMATIC LEARNING OF FUNCTIONS," which in turn is a continuation-in-part to and commonly owned U.S. patent application Ser. No. 15/292,510, filed Oct. 13, 2016, entitled "SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS," now U.S. Pat. No. 10,140,277, which claims priority to U.S. Provisional Patent Application 62/362,688, filed Jul. 15, 2016, the entireties of all which are hereby incorporated by reference herein.

BACKGROUND

Many people use electronic document preparation systems to help prepare important documents electronically. For example, each year millions of people use electronic document preparation systems customized for various particular fields, such as for tax, i.e. electronic tax return preparation systems, to help prepare and file their tax returns. Typically, electronic document preparation systems receive user information from a user and then automatically populate the various fields in electronic versions of government tax forms. Electronic tax return preparation systems represent a potentially flexible, highly accessible, and affordable source of tax return preparation assistance for customers. However, processes that enable the electronic tax return preparation systems to determine underlying relations between the various fields and automatically determine and populate various data fields of the tax forms typically utilize large amounts of computing system resources and human resources.

For instance, using an electronic tax return preparation system as an example, due to changes in tax laws, or due to updates in government tax rules, tax forms can change from year to year, or even multiple times in a same year. If a physical or electronic tax form required by a governmental entity is updated, or a new tax form is introduced, it is typically very difficult to efficiently update electronic tax return preparation systems to correctly determine tax data appropriate for and populate the various fields of the new or changed tax forms with required values. Tax forms are written by humans for human review, interpretation and understanding. A particular line of an updated tax form may have text describing a requirement of an input according to one or more functions that use line item values from other lines of the updated tax form and/or line item values from other tax related forms or worksheets. These functions range from very simple to very complex, and are often hard enough to interpret by the humans the text of the various lines was written for, and are thus even much more burdensome when a computing system is introduced in the form of a tax preparation system that is configured to prepare and/or file electronic versions of the new or updated tax forms.

Updating an electronic document preparation system, such as an electronic tax return preparation system, often includes utilizing a combination of tax or other experts to interpret the tax forms consistent with the intent of the humans who prepared the text of the tax forms, software and system engineers who consult with the experts to understand and develop the human expert view of individual forms, and large amounts of computing resources, to develop, code, and incorporate the new functions and forms into the electronic document preparation system.

Interaction that is required between the experts, software and system engineers can lead to significant software release delays and incur great expense in releasing an updated version of the electronic document preparation system. These delays and expenses are then passed on to customers of the electronic document preparation system who have deadlines to file documents associated with the new or updated forms. Furthermore, because humans are inherently error prone, already-existing processes for updating electronic documents can introduce significant inaccuracies into the functions and processes of the electronic document preparation system.

These expenses, delays, and inaccuracies can have an adverse impact on the implementation and use of traditional electronic document preparation systems. Customers may lose confidence in the electronic document preparation systems. Furthermore, customers may simply decide to utilize less expensive options for preparing their taxes, as one example. Further, vast amounts of computing resources are consumed with determining inaccurate tax return data which is then provided to and processed by other entities, such as government entities, i.e. the Internal Revenue Service.

These issues and drawbacks are not limited to electronic tax return preparation systems. Any electronic document preparation system that assists users to electronically fill out forms or prepare documents suffers from these same inaccuracies and drawbacks when the physical forms relating to the electronic forms are created or updated. The inability for electronic systems to quickly and effectively update electronic document fields and their relationships to each other based on the text instructions associated with the new and updated forms is a longstanding technical problem.

SUMMARY

Embodiments of the present disclosure provide a technical solution to the longstanding problems discussed herein, and thus solve some of the shortcomings associated with traditional electronic document preparation systems by providing methods and systems for employing lean parsing algorithm based natural language processing to determine, generate and update machine-executable functions associated with a document preparation system, such as machine-executable functions associated with an electronic tax preparation system. Although an exemplary embodiment of this disclosure is an electronic tax return preparation system, techniques discussed herein may be applied to any electronic document preparation system.

In one embodiment, natural language programming is used to automatically analyze physical text that has been converted to electronic form in a unique and novel way to determine operators, operands, and dependencies associated with one or more lines of one or more tax forms, to use those operators, operands, and dependencies to generate one or more machine-executable functions within an electronic document preparation system and used by users of a tax preparation system, as one example, to prepare their taxes.

By employing the processes and systems discussed herein, accuracy and efficiency of generated functions is significantly improved over prior art processes and systems. Further, the software release delays discussed above as being associated with prior art systems are significantly reduced and sometimes eliminated entirely. Expenses associated with releasing an updated version of the electronic tax return preparation system are also greatly reduced, as compared with prior art systems and processes.

An electronic document preparation system in accordance with one or more embodiments provides efficient and reliable analysis of natural language text and develops machine-executable functions for incorporation into new and/or updated forms, and does so through the application of novel machine learning techniques discussed herein. The various embodiments of the disclosure can be implemented to improve the technical fields of data processing, resource management, data collection, and user experience. Therefore, the various described embodiments of the disclosure and their associated benefits amount to significantly more than an abstract idea. In particular, by utilizing machine learning to learn and incorporate new and/or updated forms in an electronic document preparation system, users can save money and time and can better manage their finances.

Using the disclosed embodiments of a method and system for transforming natural language text into machine-executable functions in an electronic document preparation system significantly greater accuracy is provided over traditional prior art systems. Therefore, the disclosed embodiments provide a technical solution to the long standing technical problem of how to efficiently develop accurate machine-executable functions through machine learning and incorporating those machine-executable functions into new and/or updated forms in an electronic document preparation system.

Herein, token and word may be used interchangeably as synonymous terms and the use of one may be replaced by the other. Further, a token may include multiple words.

In more particularity, embodiments include a computing system implemented method for transforming natural language text into machine-executable functions in an electronic document preparation system that receives electronic textual data including one or more form field values of one or more forms of the plurality of forms employed by an electronic document preparation system. The method includes, in one embodiment, analyzing the electronic textual data to determine sentence data representing separate sentences of the electronic textual data, and separating the electronic textual data into the determined separate sentences, for example, into a sentence data array, a linked list, or other form of memory structure.

The method proceeds with separating the electronic textual data into one or more memory structures formed of the sentence data of the determined plurality of separate sentences. Further, in one embodiment, for each given sentence of sentence data representing sentences in the memory structure segment data of one or more segments of the sentence data are isolated while optionally retaining data regarding one or more of the origination of the segment data within the sentence and the origination of the segment data within the within the electronic textual data. Thus, context of the segment position within sentences and paragraphs of the original text is retained so that semantics may be analyzed, if desired, in one embodiment.

In one embodiment, for each segment of the segment data a number of operations are performed. First, segment data of each segment is classified as being of a segment type of a plurality of possible predetermined segment types, and then discarding or otherwise ignoring segment data classified as being of one or more particular predetermined low importance segment types in future processing operations.

For each of the remaining segments, the method includes parsing the segment data according to one or more predetermined lexicons and determining whether the segment contains one or more operators or amounts, where an operator is a natural language token representing an operation and an amount is a constant or other numerical value.

In one embodiment, upon determining that segment data representing a segment contains operator data representing one or more operators or amount data representing one of more amounts, all operators in the segment data representing the segment are identified. In one embodiment, the method proceeds with identifying dependency data representing one or more dependencies of the segment data associated with each identified operator.

In one embodiment, any tokens not identified as either an operator or a dependency are discarded or otherwise ignored with respect to further processing of the segment.

In one embodiment, one or more operator-specific rules are applied to each identified operator of the segment data to determine a first predicate structure equivalent to the original natural language text of the segment.

In one embodiment, returning above to where a determination was made as to whether the segment being analyzed contained operator data, amount data or neither, upon determining that the segment data representing the segment does not contain operator data representing one or more operators or amount data representing one or more amounts, a series of one or more process operations are performed on the segment.

First, in one embodiment, a determination is made of each single or multiword token in the segment data that is a predetermined token of the domain. In one embodiment, the domain is the preparation and filing of tax returns.

Next, in one embodiment, a determination is made of any remaining tokens of the segment that are not predetermined tokens of the domain and mapping those determined tokens and the remaining tokens to one or more predetermined rules, resulting in a first predicate structure for the segment data of the segment being analyzed.

In one embodiment, following the mapping of the determined tokens and the remaining tokens to one or more predetermined rules, at least one or more of the first predicate structures are mapped to one or more predetermined machine-executable functions. In one embodiment, identifying a machine-executable function that is equivalent to the natural language text includes mapping dependencies identified above to arguments of the machine-executable function.

In one embodiment, the method proceeds with, in one embodiment, implementing at least one of the machine-executable functions in an electronic document preparation system.

Embodiments of the present disclosure address some of the shortcomings associated with traditional electronic document preparation systems that do not adequately and efficiently automatically learn and incorporate new functions associated with new forms or with changes associated with updated forms.

An electronic document preparation system in accordance with one or more embodiments provides efficient and reliable analysis of natural language text and develops machine-executable functions for incorporation into new and/or updated forms, and does so through the application of novel machine learning techniques discussed herein. The various embodiments of the disclosure can be implemented to improve the technical fields of data processing, resource management, data collection, and user experience. Therefore, the various described embodiments of the disclosure and their associated benefits amount to significantly more than an abstract idea. In particular, by utilizing machine learning to learn and incorporate new and/or updated forms in an electronic document preparation system, users can save money and time and can better manage their finances.

Using the disclosed embodiments of a method and system for transforming natural language text into machine-executable functions in an electronic document preparation system significantly greater accuracy is provided over traditional prior art systems. Therefore, the disclosed embodiments provide a technical solution to the long standing technical problem of how to efficiently develop accurate machine-executable functions through machine learning and incorporating those machine-executable functions into new and/or updated forms in an electronic document preparation system.

In addition, the disclosed embodiments of a method and system for transforming natural language text into machine-executable functions in an electronic document preparation system are also capable of dynamically adapting to constantly changing fields such as tax return preparation and other kinds of document preparation. Consequently, the disclosed embodiments of a method and system for transforming natural language text into machine-executable functions in an electronic document preparation system also provide a technical solution to the long standing technical problem of static and inflexible electronic document preparation systems.

The result is a much more accurate, adaptable, and robust method and system for transforming natural language text into machine-executable functions in an electronic document preparation system, but thereby serves to bolster confidence in electronic document preparation systems. This, in turn, results in: less human and computing processor resources being dedicated to analyzing new and/or updated forms because more accurate and efficient analysis methods are provided herein, i.e., fewer processing and memory storage assets; less memory and storage bandwidth being dedicated to buffering and storing data; less communication bandwidth being utilized to transmit data for analysis.

The disclosed method and system for transforming natural language text into machine-executable functions in an electronic document preparation system does not encompass, embody, or preclude other forms of innovation in the area of electronic document preparation systems. In addition, the disclosed method and system for transforming natural language text into machine-executable functions in an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for transforming natural language text into machine-executable functions in an electronic document preparation system, does not encompass, and is not merely, an abstract idea or concept.

Figure 1:
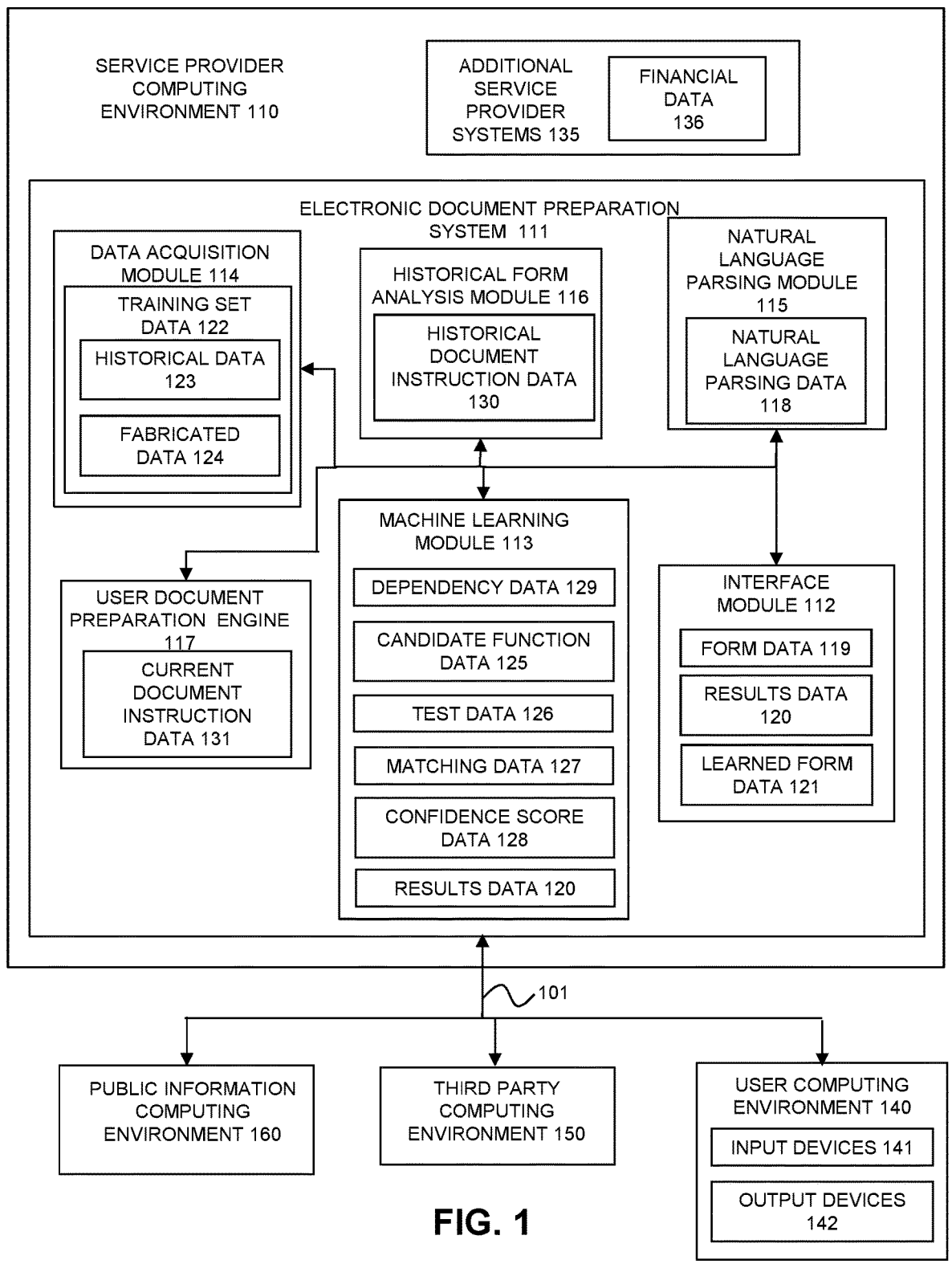
FIG. 1 is a block diagram of software architecture for transforming natural language text into machine-executable functions in an electronic document preparation system, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. For example, a production environment is, in one embodiment, used to implement the process operations disclosed herein, whether in a stand-alone application, or alternatively as a subcomponent of a larger application or system of applications. In various embodiments, production environments include multiple assets that are combined, communicatively coupled, virtually and/or physically connected, and/or associated with one another, to provide the production environment implementing the application.

As specific illustrative examples, computing and other assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, are implemented as one or more virtual assets.

In one embodiment, two or more assets, such as computing systems and/or virtual assets, and/or two or more computing environments, are coupled to or otherwise connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system. In one or more embodiments, there may be different parties noted that perform different levels of tasks, such as a user filling in a form supplied through an electronic document system managed, operated or otherwise controlled by a third party, such as a business entity.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed electronic document preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for transforming natural language text into machine-executable functions in an electronic document preparation system, according to one embodiment.

In particular, embodiments of the present disclosure receive natural language textual form data related to a new and/or updated form having data fields which generally are to be completed by a user according to natural language textual instructions set forth in the new and/or updated form. These embodiments utilize machine learning to parse and otherwise analyze natural language in a unique way and thereby correctly determine and learn one or more machine-executable functions equivalent to or otherwise represented by the instructions for each data field. One or more of those learned machine-executable functions are then incorporated into the electronic document preparation system.

In one embodiment, training set data is used to test determined functions prior to incorporating a given function into the electronic document preparation system.

Embodiments discussed herein gather training set data including previously filled forms related to the new and/or updated form, and/or including fabricated data as discussed herein. One or more embodiments of the present disclosure determine or otherwise generate, for one or more data fields needing a new learned function, dependency data that indicates one or more dependencies likely to be included in an acceptable machine-executable function for the data field.

Embodiments of the present disclosure utilize machine learning systems and processes use different techniques to generate candidate machine-executable functions for data fields to be learned. Candidate machine-executable functions are machine-executable functions which are believed to be correct, and which can either be incorporated into an electronic document management directly after the machine-executable function is determined, or alternatively, in various embodiments, after testing the candidate machine-executable functions using training set data, as discussed herein.

The candidate machine-executable functions are based, in one embodiment, on the one or more dependencies and can include one or more operators selected from a set of operators. In one embodiment, the set of operators may be developed through natural language process operations discussed herein. The operators can operate on one or more of the possible dependencies and training set data. Embodiments of the present disclosure generate test data, i.e. output data, for each candidate machine-executable function by applying the candidate machine-executable function to one or more dependencies, for example, of the training set data.

Embodiments of the present disclosure compare the test set data resulting from performing a machine-executable functions using a portion of the training set data, for example, dependencies associated with the machine-executable functions to the data values in the corresponding fields of the previously filled forms of the training set data or of the fabricated data.

In one embodiment, machine-executable functions determined to produce output corresponding with the training set data are incorporated into the electronic document preparation system.

Additionally, or alternatively, embodiments of the present disclosure can determine when one or more acceptable candidate machine-executable functions have been found and/or when the new and/or updated form has been entirely learned and can incorporate the new and/or updated form into a user document preparation engine so that users or customers of the electronic document preparation system can utilize the electronic document preparation system to electronically prepare documents involving the learned functions. By utilizing machine learning to learn and incorporate new and/or updated forms, efficiency of the electronic document preparation system is increased.

In addition, the disclosed method and system for transforming natural language text into machine-executable functions in an electronic document preparation system provides for significant improvements to the technical fields of electronic financial document preparation, data processing, data management, and user experience.

In addition, as discussed above, the disclosed method and system for transforming natural language text into machine-executable functions in an electronic document preparation system provide for the processing and storing of smaller amounts of data, i.e., more efficiently acquire and analyze forms and data, thereby eliminating unnecessary data analysis and storage. Consequently, using the disclosed method and system for transforming natural language text into machine-executable functions in an electronic document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for transforming natural language text into machine-executable functions in an electronic document preparation system.

In one embodiment, production environment 100 includes service provider computing environment 110, user computing environment 140, third party computing environment 150, and public information computing environments 160, for transforming natural language text into machine-executable functions in an electronic document preparation system, according to one embodiment. Computing environments 110, 140, 150, and 160 are communicatively coupled to each other with one or more communication channels 101, according to one embodiment.

Service provider computing environment 110 represents one or more computing systems such as a server or distribution center that is configured to receive, execute, and host one or more electronic document preparation systems (e.g., applications) for access by one or more users, for transforming natural language text into machine-executable functions in an electronic document preparation system, according to one embodiment. Service provider computing environment 110 represents a traditional data center computing environment, a virtual asset computing environment (e.g., a cloud computing environment), or a hybrid between a traditional data center computing environment and a virtual asset computing environment, according to one embodiment.

Service provider computing environment 110 includes electronic document preparation system 111 configured to provide electronic document preparation services to a user.

According to various embodiments, electronic document preparation system 111 is a system that assists in preparing financial documents related to one or more of tax return preparation, invoicing, payroll management, billing, banking, investments, loans, credit cards, real estate investments, retirement planning, bill pay, and budgeting. Electronic document preparation system 111 can be a tax return preparation system or other type of electronic document preparation system. Electronic document preparation system 111 can be a standalone system that provides financial document preparation services to users. Alternatively, electronic document preparation system 111 can be integrated into other software or service products provided by a service provider.

In one embodiment, electronic document preparation system 111 assists users in preparing documents related to one or more forms that include data fields which are intended to be completed by a user. The data fields may require data entries in accordance with specified instructions, and those data fields, which typically appear first as physical sheets of paper with natural language instructions, can be represented by machine-executable functions to be executed by a computing processor in the context of an electronic document preparation system. Once the electronic document preparation system has learned machine-executable functions that produce the required data entries for the data fields, the electronic document preparation system can assist individual users in electronically completing the form.

In many situations, such as in tax return preparation situations, state and federal governments or other financial institutions issue new or updated versions of standardized forms each year or even several times within a single year. Each time a new and/or updated form is released, electronic document preparation system 111 needs to learn specific machine-executable functions that provide the required data entries for one or more data fields in the new and/or updated form, such as a data field of a new or updated line associated with an updated form such as a new or updated tax form.

If these data fields are not correctly completed, there can be serious financial consequences for users. Furthermore, if electronic document preparation system 111 does not quickly learn and incorporate new and/or updated forms into electronic document preparation system 111, users of the electronic document preparation system 111 may turn to other forms of financial document preparation services. In traditional electronic document preparation systems, new and/or updated forms are learned and incorporated by financial professionals and/or experts manually reviewing the new and/or updated forms and manually revising software instructions to incorporate the new and/or updated forms. This can be a slow, expensive, and unreliable process, and often results in the electronic document preparation being very upsetting for users. Further, manually revising software instructions typically takes many man hours over many days or weeks, depending on the extent of the changes. Electronic document preparation system 111 of the present disclosure advantageously utilizes machine learning in addition to training set data in order to quickly and efficiently learn machine-executable functions related to data fields of a form and incorporate those machine-executable functions into electronic document preparation system 111.

According to one embodiment, electronic document preparation system 111 receives form data related to a new form or related to an updated version of a previously known form. Electronic document preparation system 111 analyzes the form data and identifies data fields of the form. Electronic document preparation system 111 acquires training set data that is related to an older or previously known version of the new or updated version of the form. The training set data can include historical data of or related to previously prepared documents including copies of the form, or a related form, with one or more completed data fields. The previously prepared documents can include previously prepared documents that have already been filed with and approved by government or other institutions, or that were otherwise validated or approved.

Additionally, or alternatively, the training set data can include fabricated data that includes previously prepared documents using fictitious data or real data that has been scrubbed of personal identifiers or otherwise altered. Electronic document preparation system 111 utilizes machine learning in combination with the training set data to learn machine-executable functions that determine data entries for the data fields of the new and/or updated form.

In one embodiment, electronic document preparation system 111 identifies one or more dependencies for each data field to be learned. These dependencies can include one or more data values from other data fields of the new and/or updated form, one or more data values from another related form or worksheet, one or more constants, or many other kinds of dependencies that can be included in an acceptable machine-executable function for a particular data field.

Electronic document preparation system 111 can identify the one or more possible dependencies based on natural language parsing of descriptive text included in the new and/or updated form and/or additional instructions and associated descriptive text provided with the new or updated form. Electronic document preparation system 111 can identify one or more possible dependencies by analyzing software from previous electronic document preparation systems that processed forms related to the new and/or updated form. Electronic document preparation system 111 can identify possible dependencies by receiving data from an expert, from a third party, or from another source.

In one embodiment, electronic document preparation system 111 generates, for each data field to be learned, one or more candidate machine-executable functions based on the one or more dependencies and including one or more operators from a set of operators. Operators may be any boolean, logical and/or mathematical operation, or any combination thereof. In various embodiments, operators include one or more of arithmetic operators such as addition, subtraction, multiplication, or division operators; logical operators such as if-then operators; existence condition operators that depend on the existence of a data value in another data field of new and/or updated form, in a form other than the new and/or updated form, or in some other location or data set; and string comparisons including greater than, less than and equal to, among others.

In one embodiment, once one or more candidate machine-executable functions are generated, electronic document preparation system 111 generates test data by applying candidate machine-executable functions to the training set data.

Electronic document preparation system 111 then generates matching data that indicates how closely the test data matches the training set data. When electronic document preparation system 111 finds a candidate machine-executable function that results in test data that matches or closely matches the training set data within a predetermined margin of error, electronic document preparation system 111 can determine that the candidate machine-executable function is an acceptable machine-executable function for the particular data field of the new and/or updated form.

In one embodiment, electronic document preparation system 111 can generate and output results data for review. The results data can include one or more of the candidate machine-executable functions that are determined to be acceptable machine-executable functions, according to the matching data, for respective data fields of the new and/or updated form.

Electronic document preparation system 111 request, in one embodiment, input from an expert to approve at least one of the acceptable candidate machine-executable functions. Additionally, or alternatively, the electronic document preparation system 111 can automatically determine that the candidate machine-executable function is acceptable, based on whether the test data matches the training set data, and update electronic document preparation system 111 without review or approval. In this way, the electronic document preparation system automatically learns, in one embodiment, and incorporate new or revised data fields and forms into electronic document preparation system 111.

Electronic document preparation system 111 includes interface module 112, machine learning module 113, data acquisition module 114, natural language parsing module 115, historical form analysis module 116, and user document preparation engine 117, according to one embodiment.

Interface module 112 is configured to receive form data 119 related to a new and/or updated form. Interface module 112 can receive the form data 119 from an expert, from a government agency, from a financial institution, or in other ways now known or later developed.

According to one embodiment, when a new and/or updated form is made available, an expert, other personnel, or other human or nonhuman resources of electronic document preparation system 111 can upload, scan and convert readable text using optical character recognition, or otherwise provide an electronic version of the form and/or other related documentation such as instructions to prepare one or more lines of the form, all part of form data 119, in various embodiments, to interface module 112. Interface module 112 can also receive form data 119 in an automated manner, such as by receiving automatic updates from an authority who designs or otherwise is responsible for establishing or updating the form, or in another way known to those of ordinary skill. The electronic version of the form is represented by form data 119. Form data 119, in various embodiments, includes one or more of one or more PDF documents, one or more HTML documents, one or more text documents, or other types of electronic document formats. The form data includes, in one embodiment, data related to data fields of the received form, limiting values, tables, or other data related to the new and/or updated form and its data fields that are used in the machine learning process.

Interface module 112 can also output results data 120 indicating the results of a machine learning process for particular candidate machine-executable functions. The interface module 112 can also output learned form data 121 including one or more finalized learned machine-executable functions, i.e. those machine-executable functions that have been determined by processes discussed herein and which have been determined to be acceptable within a predetermined margin of error.

An expert obtains and reviews results data 120 and learned form data 121 from interface module 112, in one embodiment. Results data 120 or other test data is utilized, in one embodiment, by an expert and/or an automated system to use for other process operations discussed herein. For example: results data 120 or other test data is used, in one embodiment, by electronic document preparation system 111 or any other electronic document preparation system to test software instructions of the electronic document preparation system before making functionality associated with the software instructions available to the public.

The machine learning module 113 analyzes form data 119 in order to learn machine-executable functions for the data fields of the new and/or updated form and incorporate them into electronic document preparation system 111. The machine learning module 113 generates results data 120 and learned form data 121.

In one embodiment, the machine learning module 113 is able to generate and test thousands of candidate machine-executable functions very rapidly in successive iterations. The machine learning module 113 can utilize one or more algorithms to generate candidate machine-executable functions based on many factors.

For example, machine learning module 113 can generate new candidate machine-executable functions based on previously tested candidate machine-executable functions. Inputs to the machine-executable function generation process include, in one embodiment, outputs of the natural language processing process operations discussed herein, such as lean parsing and other parsing processes and otherwise.

In one embodiment, the electronic document preparation system 111 uses data acquisition module 114 to acquire training set data 122. Training set data 122 includes, in various embodiments, previously prepared documents for one or more previous users of the electronic document preparation system 111 and/or fictitious users of the electronic document preparation system 111. Training set data 122 is used, in one embodiment, by machine learning module 113 in order to learn and incorporate machine-executable functions of the new and/or updated form into electronic document preparation system 111.

In one embodiment, training set data 122 includes historical data 123 related to previously prepared documents or previously filed forms of one or more users. Historical data 123 can include, for each of a number of previous users of electronic document preparation system 111, a respective completed or partially completed copy of the new and/or updated form or a completed or partially completed copy of a form related to the new and/or updated form. The copies of the form include data values in at least the data fields for which one or more machine-executable functions are to be determined.

In one embodiment, training set data 122 includes fabricated data 124. fabricated data 124 includes, in one embodiment, copies of the new and/or updated form that were previously filled using fabricated data. The fabricated data of fabricated data 124 includes, in one embodiment, real data from previous users or other people that has been scrubbed of personal identifiers or otherwise altered. Further, fabricated data 124 includes, in one embodiment, data that matches the requirements of each data field and which may or may not have been used in a filing of a formal document with the authorities, such as with the Internal Revenue Service.

In one embodiment, historical data 123 and/or fabricated data 124 also includes related data used to complete the forms and to prepare the historical document, such as one or more worksheets or other subcomponents that are used to determine data values of one or more data fields of the training set data. The historical data 123 includes, in one embodiment, previously prepared documents that include or use completed form data which were filed with and/or approved by a government or other institution. In this way, a large portion of historical data 123 is highly accurate and properly prepared, though a small portion of the previously prepared documents might include errors. Typically, functions for computing or obtaining the proper data entry for a data field of a form include data values from other forms related to each other and sometimes complex ways. Thus, historical data 123 include, in one embodiment, for each historical user in the training set data, a final version of a previously prepared document, the form that is related to the new and/or updated form to be learned, other forms used to calculate the values for the related form, and other sources of data for completing the related form.

In one embodiment, electronic document preparation system 111 is a financial document preparation system. In this case, historical data 123 includes historical financial data. Historical financial data 123 includes, in one embodiment, for one or more historical users of electronic document preparation system 111, data representing one or more items associated with various users, i.e. the subjects of the electronic forms, such as, but not limited to, one or more of a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, item name and description, item purchase cost, date of purchase, and any other information that is currently used, that can be used, or that are used in the future, in a financial document preparation system or in the preparation of financial documents such as a user's tax return, according to various embodiments.

In one embodiment, data acquisition module 114 is configured to obtain or retrieve historical data 123 from one or more sources, including a large number of sources, e.g. 100 or more. The data acquisition module 114 retrieves, in one embodiment, from databases of electronic document preparation system 111, historical data 123 that has been previously obtained by electronic document preparation system 111 from third-party institutions. Additionally, or alternatively, data acquisition module 114 can retrieve historical data 123 afresh from the third-party institutions.

In one embodiment, data acquisition module 114 supplies or supplements historical data 123 by gathering pertinent data from other sources including third party computing environment 150, public information computing environment 160, additional service provider systems 135, data provided from historical users, data collected from user devices or accounts of electronic document preparation system 111, social media accounts, and/or various other sources to merge with or supplement historical data 123, according to various embodiments.

In one embodiment, data acquisition module 114 gathers additional data including historical financial data and third party data. For example, data acquisition module 114 is configured to communicate with additional service provider systems 135, e.g., a tax return preparation system, a payroll management system, or other electronic document preparation system, to access financial data 136, according to one embodiment. Data acquisition module 114 imports relevant portions of the financial data 136 into the electronic document preparation system 111 and, for example, saves local copies into one or more databases, according to one embodiment.

In one embodiment, additional service provider systems 135 include a personal electronic document preparation system, and data acquisition module 114 is configured to acquire financial data 136 for use by electronic document preparation system 111 in learning and incorporating the new or updated form into electronic document preparation system 111. Because the service provider provides both electronic document preparation system 111 and, for example, additional service provider systems 135, service provider computing environment 110 can be configured to share financial information between the various systems. By interfacing with additional service provider systems 135, data acquisition module 114 automatically and periodically supplies or supplements, in one embodiment, historical data 123 from financial data 136. Financial data 136 can include income data, investment data, property ownership data, retirement account data, age data, data regarding additional sources of income, marital status, number and ages of children or other dependents, geographic location, and other data that indicates personal and financial characteristics of users of other financial systems, according to one embodiment.

Data acquisition module 114 is configured to acquire additional information from various sources to merge with or supplement training set data 122, according to one embodiment. For example, data acquisition module 114 is configured, in one embodiment, to gather historical data 123 from various sources. For example, data acquisition module 114 is configured, in one embodiment, to communicate with additional service provider systems 135, e.g., a tax return preparation system, a payroll management system, or other financial management system, to access financial data 136, according to one embodiment. Data acquisition module 114 imports at least a portion of financial data 136 into training set data 122 and, for example, saves local copies into one or more databases, according to one embodiment.

Data acquisition module 114 is configured to acquire additional financial data from the public information computing environment 160, according to one embodiment. The training set data is gathered, in one embodiment, from public record searches of tax records, public information databases, property ownership records, and other public sources of information. Data acquisition module 114 is also configured, in one embodiment, to also acquire data from sources such as social media websites, such as Twitter, Facebook, LinkedIn, and the like.

Data acquisition module 114 is configured to acquire data from third parties, according to one embodiment. For example, data acquisition module 114 requests and receives test data 126 from the third party computing environment 150 to supply or supplement training set data 122, according to one embodiment. In one embodiment, third party computing environment 140 is configured to automatically transmit financial data to electronic document preparation system 111 (e.g., to the data acquisition module 114), to be merged into training set data 122. The third party computing environment 140 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, electronic document preparation system 111 utilizes the machine learning module 113 to learn data fields of the new and/or updated form in conjunction with training set data 122. Machine learning module 113 generates candidate machine-executable functions for one or more data fields of the new and/or updated form to be learned and applies the candidate machine-executable functions to the training set data 122 in order to find an acceptable candidate machine-executable function that produces data values that match or closely match data values of the corresponding data fields of training set data 122.

In one embodiment, electronic document preparation system 111 identifies dependency data 129 including one or more possible dependencies for one or more data fields to be learned. These possible dependencies can include one or more data values from other data fields of the new and/or updated form, one or more data values from another related form or worksheet, one or more constants, or many other kinds of possible dependencies that can be included in an acceptable machine-executable function for a particular data field.

In one embodiment, machine learning module 113 generates candidate machine-executable functions based on dependency data 129 and one or more operators selected from a set of operators. The operators can include arithmetic operators such as addition, subtraction, multiplication, or division operators; logical operators such as if-then operators; existence condition operators that depend on the existence of a data value in another data field of new and/or updated form, in a form other than the new and/or updated form, or in some other location or data set; and string comparisons including greater than, less than and equal to, among others. Each candidate machine-executable function can include one or more of the operators operating on one or more of the possible dependencies.

In one embodiment, machine learning module 113 learns acceptable machine-executable functions for various data fields of a given form one at a time. In other words, if form data 119 indicates that a form has ten data fields for which machine-executable functions are to be learned, machine learning module 113 will begin by learning an acceptable machine-executable function for a first data field of the new and/or updated form before learning acceptable machine-executable functions for other data fields of the same form. In particular, machine learning module 113 will generate candidate machine-executable function data 125 corresponding to one or more candidate machine-executable functions for the first data field of the new and/or updated form as represented by form data 119.

Machine learning module 113 also receives, in one embodiment, training set data 122 from data acquisition module 114. Training set data 122 includes, in one embodiment, data related to previously completed copies of an older version of the form to be learned or previously completed copies of a form closely related to the new and/or updated form to be learned. In particular, training set data 122 includes copies of the form that have a data entry in the data field that corresponds to the data field of the new and/or updated form currently being analyzed and learned by the machine learning module 113. Training set data 122 also includes data that was used to calculate the data values in the data field for each copy of the form or for each copy of the related form, e.g. W-2 data, income data, data related to other forms such as tax forms, payroll data, personal information, or any other kind of information that was used to complete the copies of the form or the copies of the related form in training set data 122. Machine learning module 113 generates test data 126 by applying each of the candidate machine-executable functions to the training set data for the particular data field currently being learned. In particular, for each copy of the form or related form in training set data 122, machine learning module 113 applies the candidate machine-executable function to at least a portion of the training set data related to the data field being learned in order to generate a test data value for the data field. Thus, if training set data 122 includes data values of 1000+ completed copies of the new and/or updated form or a related form, then machine learning module 113 will generate test data 126 that includes one test data value for the particular data field being analyzed for at least a portion of the 1000+ completed copies.

In one embodiment, machine learning module 113 then generates matching data 127 by comparing the test data value for each copy of the form to the actual data value from the completed data field of that copy of the form. Matching data 127 indicates how many of the test data values match their corresponding completed data value from training set data 122 within a predetermined margin of error.

It is expected that training set data 122 may include some errors in the completed data values for the data field under test. Thus, an acceptable machine-executable function operating on the test data may result in test data 126 that does not perfectly match the completed data fields in training set data 122. Thus, an acceptable candidate machine-executable function will at least result in test data that matches the training set data within a predefined margin of error.

In one embodiment, when at least one acceptable machine-executable function has been found for the first data field, machine learning module 113 can repeat this process for a second data field, and so on, for each data field of the new and/or updated form to be learned.

In one embodiment, machine learning module 113 generates and tests candidate machine-executable functions one at a time. Each time matching data 127 for a candidate machine-executable function does indicates an error that exceeds the predefined margin of error, i.e. that the candidate machine-executable function is not acceptable, machine learning module 113 may generate a new candidate machine-executable function and tests the new candidate machine-executable function. Several techniques are disclosed herein for parsing natural language text and developing correct machine-executable functions, including different processes for parsing natural language textual input.

In one embodiment, machine learning module 113 outputs results data 120 indicating that a candidate machine-executable function has been determined that is likely acceptable. Results data 120 then indicates, in one embodiment, what the determined candidate machine-executable function is, matching data 127, and/or any other information that will be useful for review by an expert. Machine learning module 113 can cause interface module 112 to prompt expert user or other individual to review results data 120 and to approve the determined candidate machine-executable function as acceptable or to indicate that the determined candidate machine-executable function is not acceptable. Machine learning module 113 awaits input from the expert or other personnel approving the candidate machine-executable function. If the candidate machine-executable function is approved by the expert or other personnel, machine learning module 113 determines that the acceptable candidate machine-executable function has been found and moves on to finding an acceptable candidate machine-executable function for a next data field of the new and/or updated form, or a data field of a different new and/or updated formi.

In one embodiment, machine learning module 113 does not wait for the approval of an expert before determining that an acceptable candidate machine-executable function was found. Instead, when machine learning module 113 determines that an acceptable candidate machine-executable function has been found based on the matching data, confidence score data 128, and/or other criteria, machine learning module 113 incorporates the acceptable candidate machine-executable function into electronic document preparation system 111 and moves onto another data field of the new and/or updated form.

In one embodiment, when machine learning module 113 has learned an acceptable candidate machine-executable function for data fields of the new and/or updated form that needed to be learned, then machine learning module 113 generates learned form data 121. Learned form data 121 indicates, in one embodiment, that the new and/or updated form has been learned. Learned form data 121 can also, in one embodiment, indicate what the acceptable candidate machine-executable functions are for one or more of the data fields of the new and/or updated form. Interface module 112 can output, in one embodiment, learned form data 121 for review and/or approval by a user or expert. In one embodiment, once the user, expert or other personnel has approved learned form data 121, machine learning module 113 ceases analysis of the new and/or updated form and awaits form data 119 related to another machine-executable function, form or form field to be learned.

In one embodiment, electronic document preparation system 111 includes a user document preparation engine 117. User document preparation engine 117 assists users of electronic document preparation system 111 to prepare a financial document based on or including the newly learned form as well as other forms. User document preparation engine 117 includes current document instructions data 131. Current document instructions data 131 includes, in one embodiment, software instructions, modules, engines, or other data or processes used to assist users of electronic document preparation system 111 in electronically preparing a document.

In one embodiment, once machine learning module 113 has fully learned one or more acceptable candidate machine-executable functions for the data fields of a new and/or updated form, machine learning module 113 incorporates the newly learned form into electronic document preparation system 111 by updating current document instructions data 131. When current document instructions data 131 has been updated to include and recognize the new and/or updated form, users of the electronic document preparation system can electronically complete the new and/or updated form using electronic document preparation system 111. In this way, electronic document preparation system 111 quickly provides functionality that electronically complete the data fields of the new and/or updated form as part of preparing a financial document.

In one embodiment, user computing environment 140 is a computing environment related to a user of electronic document preparation system 111. User computing environment 140 includes, in various embodiments, input devices 141 and output devices 142 for communicating with the user, according one embodiment. Input devices 141 include, in various embodiments, but are not limited to, one or more of keyboards, mice, microphones, touchpads, touchscreens, digital pens, and the like. Output devices 142 include, in various embodiments, but are not limited to, one or more of speakers, monitors, touchscreens, and the like. Output devices 142 can, in one embodiment, display data related to the preparation of the financial document.

In one embodiment, machine learning module 113 can also generate interview content to assist in a financial document preparation interview. As a user utilizes electronic document preparation system 111 to prepare a financial document, user document preparation engine 117 may guide the user through a financial document preparation interview in order to assist the user in preparing the financial document. The interview content can include graphics, prompts, text, sound, or other electronic, visual, or audio content that assists the user to prepare the financial document. The interview content can prompt the user to provide data, to select relevant forms to be completed as part of the financial document preparation process, to explore financial topics, or otherwise assist the user in preparing the financial document. When machine learning module 113 learns acceptable machine-executable functions for one or more data fields of a form, machine learning module 113 can also generate text or other types of audio or video prompts that describe the function and that can prompt the user to provide information that user document preparation engine 117 will use to complete the form. Thus, machine learning module 113 can generate interview content to assist in a financial document preparation interview.

In one embodiment, machine learning module 113 updates current document instruction data 131 once a new and/or updated form has been entirely learned without input or approval of an expert or other personnel. In one embodiment, machine learning module 113 updates current document instructions data 131 only after an expert has given approval that the new and/or updated form has properly learned.

In one embodiment, machine learning module 113 only learns acceptable machine-executable functions for selected fields of a new and/or updated form. For example, machine learning module 113 is configured to perform machine learning processes to learn acceptable machine-executable functions for certain types of data fields. Some types of data fields may not be as conducive to machine learning processes or for other reasons machine learning module 113 is configured to learn acceptable machine-executable functions for only particular data fields of a new and/or updated form. In these cases, machine learning module 113 will only learn acceptable machine-executable functions for certain selected data fields of the new and/or updated form. In some cases, machine learning module 113 may determine that it is unable to learn an acceptable machine-executable function for one or more data fields after generating and testing many candidate machine-executable functions for the one or more data fields. Results data 120 can therefore include data indicating that an acceptable machine-executable function for a particular data field of the new and/or updated form cannot be learned by machine learning module 113.

In one embodiment, once form data 119 has been provided to electronic document preparation system 111, a user, expert or other personnel can input an indication of which data fields of the new and/or updated form should be learned by machine learning module 113. Machine learning module 113 will then only learn, in one embodiment, acceptable machine-executable functions for those fields of the new and/or updated form that have been indicated by the user, expert or other personnel. In one embodiment, form data 119 can indicate which data fields machine learning module 113 should consider. In this way, machine learning module 113 only attempts to learn acceptable machine-executable functions for the indicated data fields of a new and/or updated form.

In one embodiment, an acceptable machine-executable function for a data field is simple or complex. A complex function may require that multiple data values be gathered from multiple places within other forms, the same form, from a user, or from other locations or databases. A complex machine-executable function may also include mathematical relationships that will be applied to the multiple data values in complex ways in order to generate the proper data value for the data field. A function may include finding the minimum data value among two or more data values, finding the maximum data value among two or more data values, addition, subtraction, multiplication, division, exponential functions, logic functions, existence conditions, string comparisons, etc. The machine learning module 113 can generate and test complex candidate machine-executable functions until an acceptable machine-executable function has been found for a particular data field.

In one embodiment, new and/or updated forms may include data fields that expect data values that are alphabetical such as a first name, a last name, a middle name, a middle initial, a company name, a name of a spouse, a name of a child, a name of a dependent, a home address, a business address, a state of residence, the country of citizenship, or other types of data values that are generally alphabetic. In these cases, An acceptable machine-executable function may include a person, a last name, a middle name, a middle initial, a company name, a name of a spouse, a name of a child, a name of a defendant, a home address, a business address, a state residence, the country citizenship, or other types of alphabetic data values. An acceptable machine-executable function can also include a location from which these alphabetic data values are retrieved in other forms, worksheets, or financial related data otherwise provided by users or gathered from various sources.

The forms may also include data fields that expect data values that are numeric by nature. These expected data values may include incomes, tax withholdings, Social Security numbers, identification numbers, ages, loan payments, interest payments, charitable contributions, mortgage payments, dates, or other types of data values that are typically numeric in nature.

In one embodiment, machine learning module 113 can generate candidate machine-executable functions for a particular data field based on dependency data that can provide an indication of the types of data that are likely to be included in an acceptable machine-executable function and their likely location in other forms or data. For example, machine learning module 113 can utilize, in various embodiments, one or more of historical document instructions data 130, natural language parsing data 118, current document instruction data 121, and other types of contextual clues or hints in order to find a starting place for generating candidate machine-executable functions. For this reason, the electronic document preparation system 111 can include a natural language parsing module 115 and the historical form analysis module 116.

In one embodiment, natural language parsing module 115 analyzes form data 119 with a natural language parsing process. In particular, natural language parsing module analyzes the textual line description associated with data fields of the new and/or updated form to be learned. For example, form data 119 may include textual line descriptions and/or form text for various data fields of the new and/or updated form. The textual line descriptions and form text originate from one or more different sources, such as, in the case of the new and/or updated for being a U.S. tax form, from the IRS. The textual line descriptions and form text include, in one embodiment, text of one or more actual tax forms issued by the IRS and required to be filled out by taxpayers for which the new and/or updated form applies. The textual line descriptions and form text further include, in various embodiments, text of one or more instruction sets and publications issued by the IRS to assist the tax payer or tax preparer properly complete the form. Natural language parsing module 115 analyzes these textual line descriptions through process described herein and generates natural language parsing data 118 indicating the type of data value expected in each data field as well as function data indicating a hierarchical function representation formed as nodes and leaves of a tree. In various embodiments, the leaves of the function representation includes one or more form dependencies, such as constants, variables, and form/line dependencies where the function represented by the function representation depends on a results from data value associated with one or more different lines of the same form being analyzed, from a data value determined from a worksheet, or from one or more data values associated with one or more lines of a different tax form. Natural language parsing module 115 provides natural language parsing data 118 to machine learning module 113. Machine learning module 113 generates candidate machine-executable functions for the various data fields based on the natural language parsing data 118. In this way, the machine learning module 113 utilizes the natural language parsing data 118 to assist in the machine learning process.

In more particularity, embodiments include a computing system implemented method for transforming natural language text into machine-executable functions in an electronic document preparation system that receives electronic textual data including one or more form field values of one or more forms of the plurality of forms employed by an electronic document preparation system. The method includes, in one embodiment, analyzing the electronic textual data to determine sentence data representing separate sentences of the electronic textual data, and separating the electronic textual data into the determined separate sentences, for example, into a sentence data array, a linked list, or other form of memory structure.

The method proceeds with separating the electronic textual data into one or more memory structures formed of the sentence data of the determined plurality of separate sentences. Further, in one embodiment, for each given sentence of sentence data representing sentences in the memory structure segment data of one or more segments of the sentence data are isolated while optionally retaining data regarding one or more of the origination of the segment data within the sentence and the origination of the segment data within the within the electronic textual data. Thus, context of the segment position is retained so that semantics may be analyzed, if desired, in one embodiment.

In one embodiment, for each segment of the segment data a number of operations are performed. First, segment data of each segment is classified as being of a segment type of a plurality of possible predetermined segment types, and then discarding or otherwise ignoring segment data classified as being of one or more particular predetermined segment types in future processing operations.

For each of the remaining segments, the method includes parsing the segment data according to one or more predetermined lexicons and determining whether the segment contains one or more operators, an operator being a natural language token representing an operation.

In one embodiment, upon determining that segment data representing a segment contains operator data representing one or more operators, all operators in the segment data representing the segment are identified. In one embodiment, the method proceeds with identifying dependency data representing one or more dependencies of the segment data associated with each identified operator.

In one embodiment, any tokens not identified as either an operator or a dependency are discarded or otherwise ignored with respect to further processing of the segment.

In one embodiment, one or more operator-specific rules are applied through pattern matching to each identified operator of the segment data to determine a first predicate structure equivalent to the original natural language text of the segment.

In one embodiment, returning above to where a determination was made as to whether the segment being analyzed contained operator data or not, upon determining that the segment data representing the segment does not contain operator data representing one or more operators, a series of one or more process operations are performed on the segment.

First, a determination is made of each single or multiword token in the segment data that is a predetermined token of the domain. In one embodiment, the domain is the preparation and filing of tax returns.

Next, in one embodiment, a determination is made of any remaining tokens of the segment that are not predetermined tokens of the domain and mapping those identified tokens and the remaining tokens to one or more predetermined rules, resulting in a first predicate structure for the segment data of the segment being analyzed.

In one embodiment, following the mapping of the identified tokens and the remaining tokens to one or more predetermined rules, at least one or more of the first predicate structures are mapped to one or more predetermined machine-executable functions. In one embodiment, identifying a machine-executable function that is equivalent to the natural language text includes mapping the dependencies identified above to arguments of the machine-executable function.

Finally, the method proceeds with, in one embodiment, implementing at least one of the mapped machine-executable functions in an electronic document preparation system.

In one embodiment, historical form analysis module 116 analyzes the form data 119 in order to determine if it is likely that previous versions of electronic document preparation system 111 included software instructions that computed data values for data fields of historical forms that are similar to the new and/or updated form. Accordingly, historical form analysis module 116 analyzes historical document instruction data 130 that includes software instructions from previous versions of electronic document preparation system 111. Because it is possible that the previous versions of the electronic document preparation system utilized software languages or structures that are now obsolete, historical document instructions data 130 may not easily or simply be analyzed or imported into current document instructions data 131. For this reason, historical form analysis module 116 can analyze, in one embodiment, historical document instructions data 130 related to historical forms that are similar to the new and/or updated form. Such historical forms may include previous versions of the new and/or updated form. Historical form analysis module 116 identifies, in one embodiment, from the outdated software language portions, complete acceptable machine-executable functions related to data fields of the historical forms and generates, in one embodiment, historical instruction analysis data that indicates portions of or complete acceptable machine-executable functions for the previous version of the form. Machine learning module 113 utilizes these instructions, in one embodiment, in order to find a starting point for generating the candidate machine-executable functions in order to learn functions of data fields of the new and/or updated form.

In some cases, a new and/or updated form is nearly identical to a previously known version of the form. In these cases, training set data 122 can include historical data 123 that relates to previously prepared, filed, and/or approved financial documents that included or based on the previous known form. In these cases, data acquisition module 114 will gather training set data 122 that includes one or more previously completed copies of the previous version of the form. Machine learning module 113 generates the candidate machine-executable functions and applies them to training set data 122 as described previously.

In some cases, a new and/or updated form may include data fields that are different enough that no analogous previously prepared financial documents are available to assist in the machine learning process. In one embodiment, data acquisition module 114 gathers training set data 122 that includes fabricated financial data 124. Fabricated financial data 124 can include copies of the new and/or updated form prepared with fabricated financial data by a third-party organization or a processor system associated with service provider computing environment 110. Fabricated financial data 124 can be used by machine learning module 113 in the machine learning process for learning acceptable machine-executable functions associated with the data fields of the new and/or updated form. In such a case, the machine learning module generates candidate machine-executable functions and applies them to training set data 122 including fabricated financial data 124 as described previously.

In one embodiment, training set data 122 can include both historical data 123 and fabricated financial data 124. In some cases, historical data 123 can include previously prepared documents as well as previously fabricated financial documents based on fictitious or real financial data.

In one embodiment, data acquisition module 114 gathers new training set data 122 each time a new data field of the new and/or updated form is to be analyzed by machine learning module 113. Data acquisition module 114 can gather a large training set data 122 including many thousands or millions of previously prepared or previously fabricated financial documents. When a new data field of a new and/or updated form is to be learned by machine learning module 113, data acquisition module 114 will gather training set data 122, or a subset of training set data 122, that includes a number of previously prepared financial documents that each have a data value in a data field of a form that corresponds to the data field of the new and/or updated form that is currently being learned by machine learning module 113. In some cases, training set data 122 includes, in one embodiment, a very large number, e.g. millions, of previously prepared financial documents, only a few hundred or a thousand of the previously prepared documents are typically needed for analysis by machine learning module 113. Thus, data acquisition module 114 can gather training set data that is appropriate and efficient for machine learning module 113 to use the learning the current data field of the new and/or updated form.

In one embodiment, electronic document preparation system 111 is a tax return preparation system. Preparing a single tax return can require many government tax forms, internal worksheets used by the tax return preparation system in preparing a tax return, W-2 forms, and many other types of forms or financial data pertinent to the preparation of a tax return preparation system. For each tax return that is prepared for a user, the tax return preparation system maintains copies of various tax forms, internal worksheets, data provided by the user and any other relevant financial data used to prepare the tax return. Thus, the tax return preparation system typically maintains historical tax return data related to a large number of previously prepared tax returns. The tax return preparation system can utilize the historical tax return data to gather or generate relevant training set data 122 that can be used by machine learning module 113.

In one embodiment, a state or federal agency releases a new tax form that is a new version of a previous tax form during tax return preparation season. Form data 119 corresponds, in one embodiment, to an electronic version of the new version of the tax form. One or more of the data fields of the new tax form is similar to those of the previous tax form. Machine learning module 113 begins, in one embodiment, to learn the new tax form starting with a first selected data field of the new tax form. The first selected data field corresponds to a first selected line of the new tax form, not necessarily line 1 of the new tax form. Machine learning module 113 causes data acquisition module 114 to gather training set data 122 that includes a number of previously prepared tax returns and tax related data associated with the previously prepared tax returns. In particular, training set data 122 includes, in one embodiment, previously prepared tax returns that use a previous version of the new and/or updated form. Machine learning module 113 generates, in one embodiment, a plurality of candidate machine-executable functions for the first selected data field and applies them to training set data 122. In one embodiment, machine learning module 113 uses the results of one or more natural language process operations discussed herein.

For each candidate machine-executable function, machine learning module generates matching data 127 indicating how well test data 126 matches training set data 122. Machine learning module 113 generates results data 120 indicating matching data 127 and/or confidence score data 128 of one or more of the candidate machine-executable functions. Results data 120 can also indicate whether a candidate machine-executable function is deemed to be an acceptable machine-executable function for the first selected data field.

In one embodiment, machine learning module 113 moves onto a second selected data field after an acceptable machine-executable function has been found for the first selected data field. In one embodiment, the data fields correspond to selected lines of the new tax form. Machine learning module 113 continues in this manner until functions relating to all selected data fields of the new tax form have been learned. Machine learning module 113 then generates learned form data 121 indicating that all selected fields of the new and/or updated form have been learned. Interface module 112 presents, in one embodiment, results data 120 and/or learned form data 121 for review and/or approval by an expert or other personnel. Alternatively, machine learning module 113 can move from one data field to the next data field without approval or review by an expert, as explained herein.

In one embodiment, the tax return preparation system receives form data 119 corresponding to a new and/or updated form for which a similar previously known form cannot be found. In this case, data acquisition module 114 gathers training set data that can include fabricated financial data 124. The fabricated financial data 124 can include fictitious previously prepared tax returns and fabricated financial data that was used to prepare them. Data acquisition module 114 can obtain fabricated financial data 124 from one or more third parties, one or more associated tax return preparation systems, or in any other way. For example, the tax return preparation system can generate fabricated financial data 124 and provide it to one or more third parties to prepare a fabricated tax return using the new tax form. Fabricated financial data 124 includes, in one embodiment, one or more of data related to real users of the tax return preparation system, a script of actual identifiers such as real names, real Social Security numbers, etc. The third parties can then prepare tax returns from the fabricated financial data using the new and/or updated form. The third parties can then provide the fabricated tax returns to the tax return preparation system. The tax return preparation system can then utilize fabricated financial data 124 in conjunction with machine learning module 113 to learn the functions for the data fields of the new and/or updated form.

In one specific illustrative example, the tax return preparation system receives form data 119 related to a new tax form. Data acquisition module 114 gathers training set data 122 that at least includes historical tax return data related to previously prepared tax returns and or fabricated historical tax return data related to fabricated tax returns using the new form. In this example, machine learning module 113 undertakes to learn an acceptable machine-executable function for generating the data value required by line 3 of the new tax form. Machine learning module 113 uses, in one embodiment, at least a portion of the dependency data that indicates that an acceptable machine-executable function for line 3 is likely based on the values of line 31, line 2c, and the constants 3000 and 6000.

Training set data 122 includes, in one embodiment, previously completed copies of the new form or a related form having data values for line 3 that are believed to be correct.

Training set data 122 also includes, in one embodiment, tax related data that were used to prepare the previously completed copies.

Machine learning module 113 generates at least one candidate machine-executable function for line 3 of the new form and applies the candidate machine-executable function(s) to training set data 122. In particular, machine learning module 113 generates test values of test data 126 by at least substituting at least a portion of the training set data for one or more of lines 31, 2c and the two constants 3000 and 6000 in the candidate machine-executable function for each subset of training set data for one or more of the previously completed copies, resulting in test values for line 3 of previously completed copies of the new or related form. Machine learning module 113 generates matching data by comparing the resulting test values to the actual completed data values for line 3 from training set data 122. Matching data 127 indicates how well the various test values match the actual values in line 3 of the previously completed forms. Thus, the comparison may include determining a margin of error relating to how well the test values match the actual values, or may include a straight comparison, such as subtracting one value from the other, or may include a more complex comparison, as desired by an implementer of the process operations discussed herein.

In one embodiment, if matching data 127 indicates that at least portions of test data 126 matches training set data 122 within a predefined margin of error, then machine learning module 113 determines that the candidate machine-executable function is acceptable. In the example, after one or more iterations of generating and testing candidate machine-executable functions, the machine learning module may conclude that an acceptable machine-executable function for line 3 is that if line 31 exists, then line 3 will be equal to line 31. Alternatively, if line 31 does not exist, then line 3 is the minimum of 6000 or 3000 multiplied by the value from line 2c.

In one embodiment, machine learning module 113 can also generate confidence score data 128 indicating a level of confidence that the candidate machine-executable function is acceptable. Machine learning module 113 generates results data 120 that indicate that the candidate machine-executable function is likely an acceptable machine-executable function. Interface module 112 outputs results data 120 for review and/or approval by expert, other personnel, or other human and/or nonhuman resources. The expert or other personnel can approve the candidate machine-executable function, causing machine learning module 113 to move to the next selected line of the new tax form. Alternatively, machine learning module 113 can decide that the candidate machine-executable function is acceptable without approval from an expert or other personnel and can move onto the next selected line of the new tax form.

If matching data 127 indicates that the candidate machine-executable function does not match the training set data well enough, then machine learning module 113 generates one or more other candidate machine-executable functions and generates test data 126 by applying the one or more candidate machine-executable functions to training set data 122 as described above.

Machine learning module 113 can continue from one line of the new tax form to the next until all selected lines of the tax form have been correctly learned by machine learning module 113.

In one embodiment, when all selected lines of the new tax form have been learned, machine learning module 113 generates learned form data 121 that indicates that the new tax form has been learned. Learned form data 121 can also include acceptable machine-executable functions for each selected line of the new tax form. The interface module 112 can output learned form data 121 for review by an expert or other personnel.

In one embodiment, when the tax form has been learned by machine learning module 113, machine learning module 113 updates current document instructions data 131 to include software instructions for completing the new tax form as part of the tax return preparation process.

Embodiments of the present disclosure provide a technical solution to longstanding problems associated with traditional electronic document preparation systems that do not adequately learn and incorporate new and/or updated forms into the electronic document preparation system. An electronic document preparation system in accordance with one or more embodiments provides more reliable financial management services by utilizing machine learning and training set data to learn and incorporate new and/or updated forms into the electronic document preparation system. The various embodiments of the disclosure can be implemented to improve the technical fields of data processing, data collection, resource management, and user experience. Therefore, the various described embodiments of the disclosure and their associated benefits amount to significantly more than an abstract idea. In particular, by utilizing machine learning to learn and incorporate new and/or updated forms in the electronic document preparation system, electronic document preparation system can more efficiently learn and incorporate new and/or updated forms into the electronic document preparation system.

Process

In the discussion above, reference was made to the natural language parsing module 115 analyzing the form data 119 with a natural language parsing process. The disclosure below teaches embodiments of natural language parsing processes.

In discussions above, natural language processing is one of several inputs into various processes to determine and incorporate one or more machine-executable functions into an electronic document preparation system, where the incorporated machine-executable function or functions relate to one or more form field values that need to be determined in order to complete a given form.

In particular, natural language processing is used, in one embodiment, to determine one or more operators to be used in a function that is later to be associated with a given line of a form having a form field of interest. Further, natural language processing is used, in one embodiment, to determine one or more dependencies associated with a given line of a form having a form field of interest.

In one embodiment, dependencies for a given data field of the new and/or updated form includes references to data values from one or more other data fields of the new and/or updated form. In one embodiment, the dependencies for a given data field of the new and/or updated form include references to data values from other data fields of one or more other old, new, or updated forms, worksheets, or data values from other locations internal or external to the electronic document preparation system. In one embodiment, the dependencies include one or more constants.

In addition to possibly including one or more dependencies, in one embodiment, a final function for a given data field of the new and/or updated form includes one or more operators that operate on one or more of the dependencies in a particular manner. The operators include, in various embodiments, arithmetic operators such as addition, subtraction, multiplication, division or other mathematical operators such as exponential functions and logical operators such as if-then and/or if-then-else operators, and/or Boolean operators such as true/false. The operators can include also existence condition operators that depend on the existence of a data value in another data field of new and/or updated form, in a form other than the new and/or updated form, or in some other location or data set. The operators can include string comparisons and/or rounding or truncating operations.

More particularly, embodiments include a computing system implemented method for transforming natural language text into machine-executable functions in an electronic document preparation system that receives electronic textual data including one or more form field values of one or more forms of the plurality of forms employed by an electronic document preparation system. The method includes, in one embodiment, analyzing the electronic textual data to determine sentence data representing separate sentences of the electronic textual data, and separating the electronic textual data into the determined separate sentences, for example, into a sentence data array, a linked list, or other form of memory structure.

The method proceeds with separating the electronic textual data into one or more memory structures formed of the sentence data of the determined plurality of separate sentences. Further, in one embodiment, for each given sentence of sentence data representing sentences in the memory structure segment data of one or more segments of the sentence data are isolated while optionally retaining data regarding one or more of the origination of the segment data within the sentence and the origination of the segment data within the within the electronic textual data. Thus, context of the segment position is retained so that semantics may be analyzed, if desired, in one embodiment.

In one embodiment, for each segment of the segment data a number of operations are performed. First, segment data of each segment is classified as being of a segment type of a plurality of possible predetermined segment types, and then discarding or otherwise ignoring segment data classified as being of one or more particular predetermined segment types in future processing operations.

For each of the remaining segments, the method includes parsing the segment data according to one or more predetermined lexicons and determining whether the segment contains one or more operators, an operator being a natural language token representing an operation.

In one embodiment, upon determining that segment data representing a segment contains operator data representing one or more operators, all operators in the segment data representing the segment are identified. In one embodiment, the method proceeds with identifying dependency data representing one or more dependencies of the segment data associated with each identified operator.

In one embodiment, any tokens not identified as either an operator or a dependency are discarded or otherwise ignored with respect to further processing of the segment.

In one embodiment, one or more operator-specific rules are applied through pattern matching to each identified operator of the segment data to determine a first predicate structure equivalent to the original natural language text of the segment.

In one embodiment, returning above to where a determination was made as to whether the segment being analyzed contained operator data or not, upon determining that the segment data representing the segment does not contain operator data representing one or more operators, a series of one or more process operations are performed on the segment.

First, a determination is made of each single or multiword token in the segment data that is a predetermined token of the domain. In one embodiment, the domain is the preparation and filing of tax returns.

Next, in one embodiment, a determination is made of any remaining tokens of the segment that are not predetermined tokens of the domain and mapping those identified tokens and the remaining tokens to one or more predetermined rules, resulting in a first predicate structure for the segment data of the segment being analyzed.

In one embodiment, following the mapping of the identified tokens and the remaining tokens to one or more predetermined rules, at least one or more of the first predicate structures are mapped to one or more predetermined machine-executable functions. In one embodiment, identifying a machine-executable function that is equivalent to the natural language text includes mapping the dependencies identified above to arguments of the machine-executable function.

Finally, the method proceeds with, in one embodiment, implementing at least one of the mapped machine-executable functions in an electronic document preparation system.

Embodiments of the present disclosure address some of the shortcomings associated with traditional electronic document preparation systems that do not adequately and efficiently automatically learn and incorporate new functions associated with new forms or with changes associated with updated forms. An electronic document preparation system in accordance with one or more embodiments provides efficient and reliable analysis of natural language text and develops machine-executable functions for incorporation into new and/or updated forms, and does so through the application of novel machine learning techniques discussed herein. The various embodiments of the disclosure can be implemented to improve the technical fields of data processing, resource management, data collection, and user experience. Therefore, the various described embodiments of the disclosure and their associated benefits amount to significantly more than an abstract idea. In particular, by utilizing machine learning to learn and incorporate new and/or updated forms in an electronic document preparation system, users can save money and time and can better manage their finances.

Using the disclosed embodiments of a method and system for transforming natural language text into machine-executable functions in an electronic document preparation system significantly greater accuracy is provided over traditional prior art systems. Therefore, the disclosed embodiments provide a technical solution to the long standing technical problem of how to efficiently develop accurate machine-executable functions through machine learning and incorporating those machine-executable functions into new and/or updated forms in an electronic document preparation system.

In addition, the disclosed embodiments of a method and system for transforming natural language text into machine-executable functions in an electronic document preparation system are also capable of dynamically adapting to constantly changing fields such as tax return preparation and other kinds of document preparation. Consequently, the disclosed embodiments of a method and system for transforming natural language text into machine-executable functions in an electronic document preparation system also provide a technical solution to the long standing technical problem of static and inflexible electronic document preparation systems.

The result is a much more accurate, adaptable, and robust method and system for transforming natural language text into machine-executable functions in an electronic document preparation system, but thereby serves to bolster confidence in electronic document preparation systems. This, in turn, results in: less human and processor resources being dedicated to analyzing new and/or updated forms because more accurate and efficient analysis methods are provided herein, i.e., fewer processing and memory storage assets; less memory and storage bandwidth being dedicated to buffering and storing data; less communication bandwidth being utilized to transmit data for analysis.

The disclosed method and system for transforming natural language text into machine-executable functions in an electronic document preparation system does not encompass, embody, or preclude other forms of innovation in the area of electronic document preparation systems. In addition, the disclosed method and system for transforming natural language text into machine-executable functions in an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for transforming natural language text into machine-executable functions in an electronic document preparation system, does not encompass, and is not merely, an abstract idea or concept.

Figure 2A:
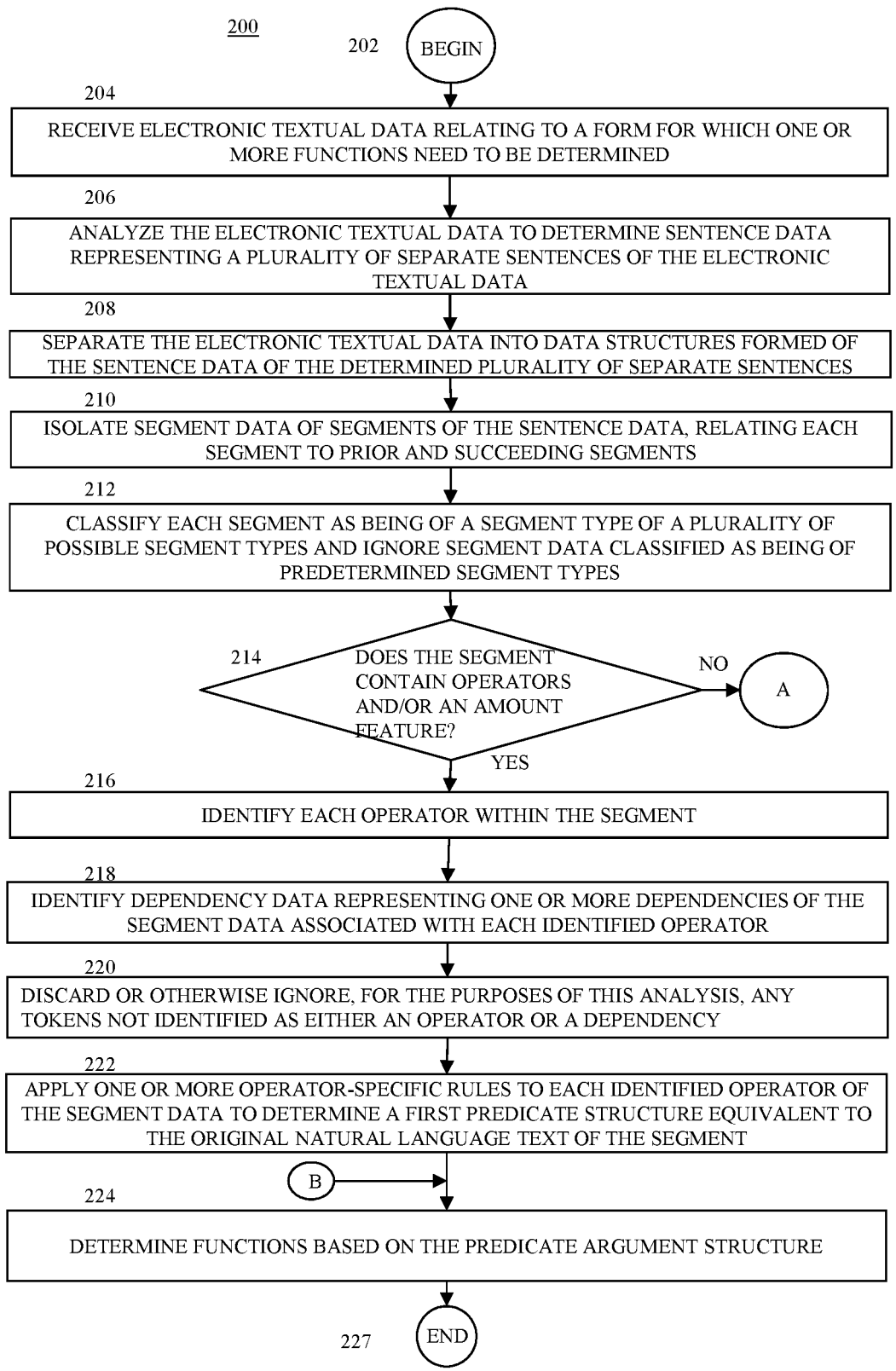
FIGS. 2A and 2B are a block diagram of a process for transforming natural language text into machine-executable functions in an electronic document preparation system, in accordance with one embodiment.
Figure 2B:
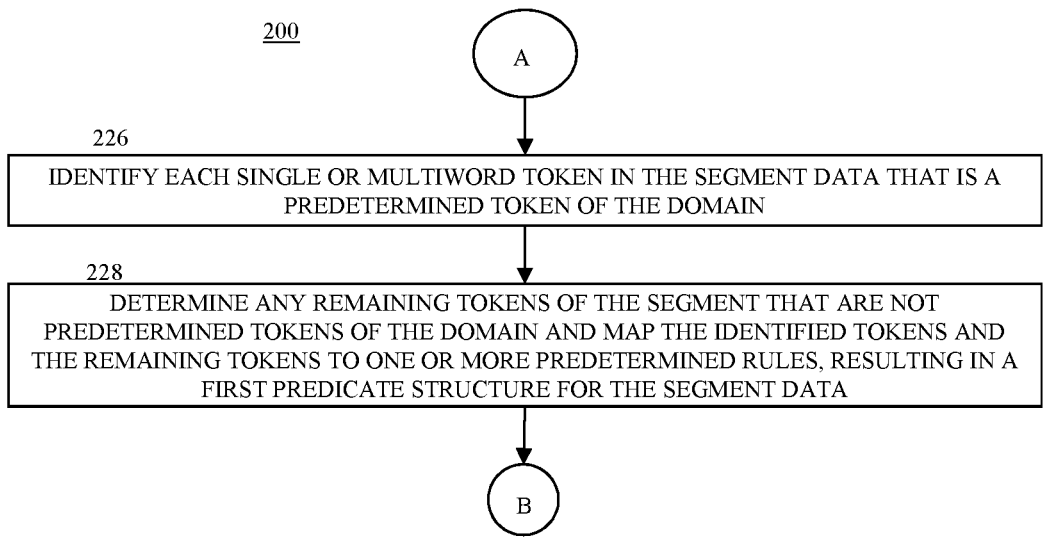

FIGS. 2A and 2B together present a flow diagram of a process for transforming natural language text into machine-executable functions in an electronic document preparation system, in accordance with one embodiment.

At any time during the processing operation discussed herein, it may be advantageous to remove words from one or more segments that are considered unnecessary. In such a circumstance, tokens of the segment being considered are compared against a predetermined list of stop words, and any tokens of the segment found on that list are removed from further consideration, are deleted from the segment, or are otherwise ignored.

Referring to FIG. 1 and FIGS. 2A and 2B together, process 200 for transforming natural language text into machine-executable functions in an electronic document preparation system starts with BEGIN OPERATION 202 and process flow proceeds with RECEIVE ELECTRONIC TEXTUAL DATA RELATING TO A FORM FOR WHICH ONE OR MORE FUNCTIONS NEED TO BE DETERMINED OPERATION 204.

In one embodiment, at RECEIVE ELECTRONIC TEXTUAL DATA RELATING TO A FORM FOR WHICH ONE OR MORE FUNCTIONS NEED TO BE DETERMINED OPERATION 204, interface module 112 is configured to receive form data 119 related to a new and/or updated form. Interface module 112 can receive the form data 119 from an expert, from a government agency, from a financial institution, or in other ways now known or later developed.

In various embodiments, form data 119 originates as one or more physical printed pages or electronic equivalents of actual form data relating to the physical form, such as an instruction booklet or other documentation, to electronic textual data. For example, the form data 119 may include textual line descriptions and/or form text for various data fields of the new and/or updated form. The textual line descriptions and form text originate from one or more different sources, such as, in the case of the new and/or updated U.S. tax form, from the Internal Revenue Service (IRS). The textual line descriptions and form text include, in one embodiment, text of one or more actual tax forms issued by the IRS and required to be filled out by taxpayers for which the new and/or updated form applies. The textual line descriptions and form text further include, in one embodiment, text of one or more instruction sets and publications issued by the IRS to assist the tax payer or tax preparer properly complete the form. The natural language parsing module 115 analyzes, in one embodiment, these textual line descriptions through process described herein and generates natural language parsing data 118 indicating the type of data value expected in each data field, among other things. Each of the textual line descriptions are tagged or otherwise marked to indicate their source and which line the textual line description applies.

In one embodiment, form data 119 relates to specific subsections of a given new or updated form, such as form text and/or form data of or relating to one or more form fields of the new or updated form, such as changed sections of the form from a prior version. In one embodiment, at RECEIVE ELECTRONIC TEXTUAL DATA RELATING TO A FORM FOR WHICH ONE OR MORE FUNCTIONS NEED TO BE DETERMINED OPERATION 204, form data 119 originates as one or more portions or components of physical forms such as paper forms which are scanned or otherwise converted through optical character recognition or other known or later developed methods from physical form to electronic textual data of form data 119. In one embodiment, the electronic textual data relating to portions of or the entirety of the new or updated form is collected into an electronic text corpus including all of the acquired and converted text data and stored as at least a portion of form data 119.

In one embodiment, following completion of RECEIVE ELECTRONIC TEXTUAL DATA RELATING TO A FORM FOR WHICH ONE OR MORE FUNCTIONS NEED TO BE DETERMINED OPERATION 204, process flow proceeds with ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 206.

In one embodiment, at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 206, the electronic text corpus of form data 119 formed at RECEIVE ELECTRONIC TEXTUAL DATA RELATING TO A FORM FOR WHICH ONE OR MORE FUNCTIONS NEED TO BE DETERMINED OPERATION 204 is analyzed to determine individual sentences of the electronic text corpus and to separate sentence data representing those individual sentences into a data array whose array members are the individual sentences of the electronic text corpus. In one embodiment, the sentences of the electronic text corpus are not formed as individual members of a data array, but rather are processed individually, thus processing sentence data representing each individual sentence according to one or more of the process operations discussed herein.

In one embodiment, following the electronic text corpus of RECEIVE ELECTRONIC TEXTUAL DATA RELATING TO A FORM FOR WHICH ONE OR MORE FUNCTIONS NEED TO BE DETERMINED OPERATION 204 being analyzed and separated into sentences at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 206, process flow proceeds with SEPARATE THE ELECTRONIC TEXTUAL DATA INTO DATA STRUCTURES FORMED OF THE SENTENCE DATA OF THE DETERMINED PLURALITY OF SEPARATE SENTENCES OPERATION 208 where the electronic textual data analyzed at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 206 is separated into a data array formed of individual sentence data items, each data item of the data array representing a different sentence of the text corpus. In one embodiment, following the electronic textual data being separated into a data array formed of individual sentence data items, each data item of the data array representing a different sentence of the text corpus at SEPARATE THE ELECTRONIC TEXTUAL DATA INTO DATA STRUCTURES FORMED OF THE SENTENCE DATA OF THE DETERMINED PLURALITY OF SEPARATE SENTENCES OPERATION 208, process flow proceeds with ISOLATE SEGMENT DATA OF SEGMENTS OF THE SENTENCE DATA, RELATING EACH SEGMENT TO PRIOR AND SUCCEEDING SEGMENTS OPERATION 210.

In one embodiment, at ISOLATE SEGMENT DATA OF SEGMENTS OF THE SENTENCE DATA, RELATING EACH SEGMENT TO PRIOR AND SUCCEEDING SEGMENTS OPERATION 210, sentence data of SEPARATE THE ELECTRONIC TEXTUAL DATA INTO DATA STRUCTURES FORMED OF THE SENTENCE DATA OF THE DETERMINED PLURALITY OF SEPARATE SENTENCES OPERATION 208 are each processed individually, but not necessarily in series. Sentences of sentence data may be processed in parallel, but the processing for different sentences of the sentence data and segments resulting from processing those sentence data are tracked, so that the results may be attributed to the proper input and so that the eventual machine-executable functions that result will be properly implemented into the electronic document preparation system, e.g. as relating to the correct line of a tax return being prepared, as one example. In one embodiment, segments are determined according to actions or conditionals associated with portions of sentences. In one embodiment, sentence data corresponding to a sentence under consideration is separated into two or more segments based, at least in part, on the punctuation of the sentence. In various embodiments, a sentence of the sentence data is broken into two or more segments based on the presence of one or more semicolons, or one or more colons, or both. In one embodiment, a first segment in the sentence data ends with a semi colon, and a second segment of the sentence data follows the semicolon.

For example, a sentence such as "If you check (in Part 1: Box 1, 2, 4 or 7, enter $5000; Box 3, 5, or 6, Enter $7500; Box 8 or 9, Enter $3750" would typically be broken down, in one embodiment, into four segments as shown below.

| Segment 1 | If you checked (in Part 1): |
| Segment 2 | Box 1, 2, 4, or 7, Enter $5,000 |
| Segment 3 | Box 3, 5, or 6, Enter $7,500 |
| Segment 4 | Box 8 or 9, Enter $3,750. |

Following completion of ISOLATE SEGMENT DATA OF SEGMENTS OF THE SENTENCE DATA, RELATING EACH SEGMENT TO PRIOR AND SUCCEEDING SEGMENTS OPERATION 210, process flow proceeds with CLASSIFY EACH SEGMENT AS BEING OF A SEGMENT TYPE OF A PLURALITY OF POSSIBLE SEGMENT TYPES AND IGNORE SEGMENT DATA CLASSIFIED AS BEING OF PREDETERMINED SEGMENT TYPES OPERATION 212.

In one embodiment, at CLASSIFY EACH SEGMENT AS BEING OF A SEGMENT TYPE OF A PLURALITY OF POSSIBLE SEGMENT TYPES AND IGNORE SEGMENT DATA CLASSIFIED AS BEING OF PREDETERMINED SEGMENT TYPES OPERATION 212, individual segment are examined to determine a classification for the segment. Predetermined segment types and associated parameters or rules are determined ahead of time, in order to speed processing. For example, in a tax domain, In one embodiment, classification leads to a determination of what a segment is about, such as whether the segment instructs as to an amount for a user to put into a form field, or whether the segment instead provides a description of items needed for consideration when determining an amount a user should put into a form field, or whether the segment is part of a calculation involving other form fields. Other classification types will be evident to persons or ordinary skill implementing the invention which do not depart from the teachings provided herein.

In one embodiment, the classification method to determine a classification of the segment is based on features of the segment. The output of the classification process is to assign a label to the segment. Each token in the segment is associated with semantic features captured in the entry of the token listed in a lexicon of the domain. These features represent core elements of the meaning of the token. In various exemplary embodiments, an entry "taxpayer" has, in its lexically-specified feature set, one or more of the features "animate, person, count, payer" In various exemplary embodiments, "office" has one or more features such as "inanimate, place, physical_place, work_related". In various exemplary embodiments, "tax" has one or more features such as "contribution, dues, money, count".

A class is defined by the features that the class subsumes. Thus, class "PARTICULARS" has, among its features, "name, location, profession". Class "AMOUNT" has, among its features, "arithmetic_operation, number, contribution, dues, money". Thus, a first step, in one embodiment, in sentence or segment classification is to retrieve all of the semantic features for each of the tokens in a sentence or segment. In a second step, according to one embodiment, duplicate features are removed after being counted and ranked highest to lowest based on the number of occurrences of each feature. Finally, the highest ranking feature of the sentence or segment is matched with class features to determine a best class. If membership is satisfied, the class name is the label for the sentence type. Note that, in the tax-domain, there is an exception to ranking. It is enough to have one feature, e.g. "add", of "arithmetic_operation" among the total of features for the sentence type to be of class "AMOUNT". For example, in the sentence "Add Form 1040, line 44 (minus any tax from Form 4972), and Form 1040, line 46", the verb "add" has feature "arithmetic_operation". It is enough for that feature to rank highest over all others.

In one embodiment, following completion of CLASSIFY EACH SEGMENT AS BEING OF A SEGMENT TYPE OF A PLURALITY OF POSSIBLE SEGMENT TYPES AND IGNORE SEGMENT DATA CLASSIFIED AS BEING OF PREDETERMINED SEGMENT TYPES OPERATION 212, process flow proceeds with DOES THE SEGMENT CONTAIN OPERATORS AND/OR AN AMOUNT FEATURE? OPERATION 214.

In one embodiment, at DOES THE SEGMENT CONTAIN OPERATORS AND/OR AN AMOUNT FEATURE? OPERATION 214, an analysis is performed of the segment to determine whether the segment contains one or more operators or an amount, such as a numerical value representing a dollar amount. Operators may be represented by any boolean, logical and/or mathematical related term or token and/or synonyms of those terms or tokens, or any combination thereof. In various embodiments, operators include one or more of arithmetic operators representing functions such as addition, subtraction, multiplication, or division operators; logical operators such as if-then operators; existence condition operators that depend on the existence of a data value in another data field of new and/or updated form, in a form other than the new and/or updated form, or in some other location or data set; and string and other comparisons including greater than, less than and equal to, among others. In one embodiment, in order to determine whether one or more operators are present in a given segment, the segment is parsed to determine parts of speech for each token in the segment, and then tokens presented as a particular part of speech normally associated with a part of speech associated with one or more operators are examined to determine whether the token is associated with an operation important to the language domain presented by the form and form fields being analyzed. Alternatively, if a predetermined list of operators and their synonyms are available, tokens of the segment being processed may be compared against the predetermined list.

In one embodiment, following completion of DOES THE SEGMENT CONTAIN OPERATORS AND/OR AN AMOUNT FEATURE? OPERATION 214, a determination has been made that either the segment includes one or more operators, after which process flow proceeds with IDENTIFY EACH OPERATOR WITHIN THE SEGMENT OPERATION 216, or it does not include one or more operators, at which time process flow proceeds with IDENTIFY EACH SINGLE OR MULTIWORD TOKEN IN THE SEGMENT DATA THAT IS A PREDETERMINED TOKEN OF THE DOMAIN OERATION 226.

In one embodiment, at IDENTIFY EACH OPERATOR WITHIN THE SEGMENT OPERATION 216, operators of the segment being examined are identified. In one embodiment, all operators of the segment being considered are identified. In one embodiment, if the language domain of the segment contains only operators having a given part of speech, then if the tokens of the segment have been examined and their parts of speech determined, only tokens having the given part of speech need be considered when determining whether a given token is an operator.

In one embodiment, this process operation is optional if all operators of the segment were previously determined at DOES THE SEGMENT CONTAIN OPERATORS? OPERATION 214. In one embodiment, less than the entire segment of DOES THE SEGMENT CONTAIN OPERATORS? OPERATION 214 was examined, and the remainder of the segment is now examined, to determine one or more additional operators of the segment. In one embodiment, even if only a portion of the segment was examined at DOES THE SEGMENT CONTAIN OPERATORS? OPERATION 214, if the parts of speech of all remaining tokens of the segment are known, an educated guess is made that remaining token either do or do not contain an operator, based on parts of speech of the language domain of the segment. If, for example, the parts of speech of not yet considered tokens include adverb and adjective, and of the parts of speech of operators of the language domain of the segment do not contain adverbs and adjectives, an educated guess can be made that portions of the segment that have not yet been considered do not contain operators.

Following completion of IDENTIFY EACH OPERATOR WITHIN THE SEGMENT OPERATION 216, process flow proceeds with IDENTIFY DEPENDENCY DATA REPRESENTING ONE OR MORE DEPENDENCIES OF THE SEGMENT DATA ASSOCIATED WITH EACH IDENTIFIED OPERATOR OPERATION 218.

In one embodiment, at IDENTIFY DEPENDENCY DATA REPRESENTING ONE OR MORE DEPENDENCIES OF THE SEGMENT DATA ASSOCIATED WITH EACH IDENTIFIED OPERATOR OPERATION 218, electronic document preparation system 111 identifies one or more dependencies through examination of the natural language tokens of the segment being examined. In one embodiment, the dependencies are developed by examining historical dependency data from previously analyzed documents having the same or similar form fields, and comparing that dependency data developed from previous analysis of those previous documents to the current form and/or form field being processed. In one embodiment, the dependency data is developed through a combination of techniques discussed herein.

The dependencies can include one or more data values from other data fields of the new and/or updated form, one or more data values from another related form or worksheet, one or more constants, or many other kinds of dependencies that can be included in an acceptable machine-executable function for a particular data field.

In this disclosure, when operators, dependencies and other tokens are identified within a given segment or within a given sentence, the position of the identified token within the segment or segment is noted. The segment, in one embodiment, is set forth as a linked list of tokens of the segment, and a pointer to the identified token is provided, thus preserving location details. Other ways of tracking the location of a token within a sentence or segment may also be used, while remaining within the scope and purpose of the disclosure.

In one embodiment, following completion of IDENTIFY DEPENDENCY DATA REPRESENTING ONE OR MORE DEPENDENCIES OF THE SEGMENT DATA ASSOCIATED WITH EACH IDENTIFIED OPERATOR OPERATION 218, process flow proceeds with DISCARD OR OTHERWISE IGNORE, FOR THE PURPOSES OF THIS ANALYSIS ANY TOKENS NOT IDENTIFIED AS EITHER AN OPERATOR OR A DEPENDENCY OPERATION 220.

In one embodiment, at DISCARD OR OTHERWISE IGNORE, FOR THE PURPOSES OF THIS ANALYSIS, ANY TOKENS NOT IDENTIFIED AS EITHER AN OPERATOR OR A DEPENDENCY OPERATION 220, this option process operation is noted to reflect that only the identified operators and associated identified dependencies of those identified operators move forward in the analysis and development of machine-executable functions. Any other tokens remaining within a segment are ignored or are discarded, as an implementer of the disclosed invention may desire. In one embodiment, following completion of DISCARD OR OTHERWISE IGNORE, FOR THE PURPOSES OF THIS ANALYSIS, ANY TOKENS NOT IDENTIFIED AS EITHER AN OPERATOR OR A DEPENDENCY OPERATION 220, process flow proceeds with APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222.

At this time, the process flow has identified operators of a segment being parsed or otherwise analyzed, and has further identified associated dependencies, and the position in the segment of each.

In one embodiment, at APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222, one or more operator-specific rules are applied to individual ones of sets of operators and their associated dependencies.

In one exemplary embodiment, using an exemplary segment "Enter the smaller of the amount on Schedule A, line 4, or 25% (0025) of the amount on Form 1040, line 38" its final predicate argument structure is "min((schedule(a, line (4))), (div((form(1040, line(38))), 0.25)))." To develop the predicate argument structure, the parsing procedure first scans the input segment of type "AMOUNT" previously determined at CLASSIFY EACH SEGMENT AS BEING OF A SEGMENT TYPE OF A PLURALITY OF POSSIBLE SEGMENT TYPES AND IGNORE SEGMENT DATA CLASSIFIED AS BEING OF PREDETERMINED SEGMENT TYPES OPERATION 212 for an arithmetic operator which is a member of the predefined list of operators in the tax-domain. The parser identifies the operator "smaller". Next, it examines the lexical syntactic features of the operator "smaller". In one embodiment, these features indicate that "smaller" takes two arguments in a disjunction instantiated as "smaller x or y". The rules implemented as procedures scan the segment to identify the substrings that satisfy "x" and "y", respectively. Then it binds instances of "x" and of "y" to the operator. Note that, before binding, each of the arguments of "smaller" are transformed into a target output representation. In this segment, the structured target argument "(schedule(a, line(4)))" is the left member of the "smaller" disjunction and the structured target argument "div((form(1040, line(38))), 0.25)" is the right member of the disjunction. By final binding time or slot satisfaction between predicate and arguments, any target transformation applicable to an argument takes place. In the example, the right member of the "smaller" disjunction "25% (0025) of the amount on Form 1040, line 38" has a percentage operator as head. The transformation of dividing "the amount on Form 1040, line 38" by "0.25" takes place first. The output of this transformation becomes the target structured argument "y" of the operator "smaller".

In an earlier example, a sentence such as "If you check (in Part 1: Box 1, 2, 4 or 7, enter $5000; Box 3, 5, or 6, Enter $7500; Box 8 or 9, Enter $3750" was broken down, in one embodiment, into four segments as shown below.

| | |
|---|---|
| Segment 1 | If you checked (in Part 1): |
| Segment 2 | Box 1, 2, 4, or 7, Enter $5,000 |
| Segment 3 | Box 3, 5, or 6, Enter $7,500 |
| Segment 4 | Box 8 or 9, Enter $3,750. |

In one embodiment, the first segment has a conditional "if" and an operator "checked". The second and succeeding segments include the operator "Enter" and dependencies such as "Box 1, 2, 4, or 7," "Box 3, 5, or 6," and "Box 8 or 9."

In one embodiment, at APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222, a rule specific to the operator "checked" is applied here, to determine a first predicate argument structure for a machine-executable function appropriate for the sentence that included these segments.

In one embodiment, the determined predicate argument structure for these segments takes the form
checked(part(1), box(or(1,2,4,7)))->amount(5000)
box(or(3,5,6))->amount(7500)
box(or(8,9))->amount(3750)

Here, note that the operator precedes any of the dependencies, such as how a machine-executable function is typically depicted in the software arts, e.g. an add function, for example, is typically written as "add(arg1,arg2) where arg1 and arg2 are arguments, e.g. dependencies of the add function.

In one embodiment, following completion of APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222, process flow proceeds with DETERMINE FUNCTIONS BASED ON THE PREDICATE ARGUMENT STRUCTURE OPERATION 224.

In one embodiment, at DETERMINE FUNCTIONS BASED ON THE PREDICATE ARGUMENT STRUCTURE OPERATION 224, In one embodiment, the predicate argument structure (PAS) determined at APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222 is processed by a deserialize module which deserializes the PAS string and converts it to a tree data structure. Each node in the tree has a label(predicate) and child nodes (n nodes, each node is considered an argument). In one embodiment, deserialization involves multiple rules for modifying the tree structure.

In one embodiment, when the label(predicate) is a term, it's used as-is. If the label/predicate of the PAS is an arithmetic word, it is mapped by an operator mapper to a predefined predicate. In one embodiment, the mapper operates to ensure that a commonly defined predicate name is assigned for basic arithmetic operations (Ex: add, combine, plus, all these labels result in "add" as the final predicate).

When processing an argument, the argument is validated, in various embodiments, for four cases.

In one embodiment, if the argument is a constant like a numerical value, an amount of money, or a fraction, it's left alone.

If, in one embodiment, the argument is a line of a tax form, we use keywords and the list of operands identified from the associated textual line description described above to identify a list of appropriate line numbers and supply a link or pointer to a placeholder for an amount representing that line number.

In one embodiment, one predicate argument structure may have another predicate argument structure embedded within, as an argument, If the argument being examine and analyzed is a PAS itself, then we recursively deserialize and process it as discussed herein.

If, in one embodiment, the argument is a term, then we analyze the ambiguity of the term, using the labels identified for each associated textual line description. If there is no ambiguity, then using line number-label mapping, we replace the term with its line reference. If there is ambiguity in the term definition, then we use the line reference identified from the textual line description identified during parsing the initial text.

In one embodiment, following completion of DETERMINE FUNCTIONS BASED ON THE PREDICATE ARGUMENT STRUCTURE OPERATION 224, a machine executable function mapped to the predicate argument structure above is implemented in the electronic document preparation system, either directly, or following testing of the function against training set data as outlined above.

Following the performance of DETERMINE FUNCTIONS BASED ON THE PREDICATE ARGUMENT STRUCTURE OPERATION 224, the process proceeds to END OPERATION 227, and the process exits awaiting further input.

Earlier, at DOES THE SEGMENT CONTAIN OPERATORS? OPERATION 214, an analysis was performed of the segment to determine whether the segment contains one or more operators. If the result of that determination is that there are no operators present in the segment, there are, in one embodiment, one or more dependencies of operators of the same sentence, but in a later segment, that are important. In one embodiment, process flow proceeds with IDENTIFY EACH SINGLE OR MULTIWORD TOKEN IN THE SEGMENT DATA THAT IS A PREDETERMINED TOKEN OF THE DOMAIN OPERATION 226.

In one embodiment, at IDENTIFY EACH SINGLE OR MULTIWORD TOKEN IN THE SEGMENT DATA THAT IS A PREDETERMINED TOKEN OF THE DOMAIN OPERATION 226, each token of the segment being processed is compared against a predetermined list of tokens of the particular language domain of the segment in order to determine whether any tokens of the segment appear on the list. If so, those tokens appearing both in the segment and on the predetermined list are considered identified, and are moved forward in processing. In a circumstance where no tokens of the segment are present on the predetermined list of tokens of the domain, process flow is discontinued awaiting a new segment to analyze.

In one embodiment, following completion of IDENTIFY EACH SINGLE OR MULTIWORD TOKEN IN THE SEGMENT DATA THAT IS A PREDETERMINED TOKEN OF THE DOMAIN OPERATION 226, process flow proceeds with DETERMINE ANY REMAINING TOKENS OF THE SEGMENT THAT ARE NOT PREDETERMINED TOKENS OF THE DOMAIN AND MAP THE IDENTIFIED TOKENS AND THE REMAINING TOKENS TO ONE OR MORE PREDETERMINED RULES, RESULTING IN A FIRST PREDICATE STRUCTURE FOR THE SEGMENT DATA OPERATION 228.

In one embodiment, at DETERMINE ANY REMAINING TOKENS OF THE SEGMENT THAT ARE NOT PREDETERMINED TOKENS OF THE DOMAIN AND MAP THE IDENTIFIED TOKENS AND THE REMAINING TOKENS TO ONE OR MORE PREDETERMINED RULES, RESULTING IN A FIRST PREDICATE STRUCTURE FOR THE SEGMENT DATA OPERATION 228, tokens that appear on the predetermined list of tokens of the language domain of the segment, together with any remaining tokens, e.g. dependencies, for example, are provided into a pattern matcher to map the tokens to a predicate argument structure known to the domain. Process flow then proceeds with DETERMINE FUNCTIONS BASED ON THE PREDICATE ARGUMENT STRUCTURE OPERATION 224 as outlined above.

In an exemplary embodiment reflecting the process operations described in detail above, Applicant proposes that the output of SEPARATE THE ELECTRONIC TEXTUAL DATA INTO DATA STRUCTURES FORMED OF THE SENTENCE DATA OF THE DETERMINED PLURALITY OF SEPARATE SENTENCES OPERATION 208 includes a segment Box 1, 2, 4, or 7, Enter $5,000 where the goal is to create a predicate argument structure ready for mapping to a machine executable function. Recall above where this segment is preceded by a segment reciting:

If you checked (in Part 1):

In one embodiment, at CLASSIFY EACH SEGMENT AS BEING OF A SEGMENT TYPE OF A PLURALITY OF POSSIBLE SEGMENT TYPES AND IGNORE SEGMENT DATA CLASSIFIED AS BEING OF PREDETERMINED SEGMENT TYPES OPERATION 212, a sentence or segment type is determined for the exemplary segment.

In the tax-domain ontology, there is, in one embodiment, a short list of tokens that are associated with the classification "amount." Such tokens associated with the classification "amount" are such tokens as "form," "line," "box," and "column." Since this segment contains the token "box," there is a likelihood that the segment is of type "amount." In addition, in one embodiment, other lexically-based features or diacritics are used to confirm the classification. Here, there is a dollar amount ($) and action verb "enter," both leading towards the same conclusion that the segment is of classification "amount."

In one embodiment, process flow then proceeds to DOES THE SEGMENT CONTAIN OPERATORS? OPERATION 214 where the segment is parsed from left to right to determine whether any operators are present within the segment.

Proceeding from left to right in the segment, the first token in this exemplary embodiment segment is "box." At this time, in one embodiment, lexical preferences or features associated with "box" are retrieved from a tax ontology framework. In one embodiment, lexical preferences state that "box" is an operator that is typically has numerical apposition on its right. In one embodiment, at IDENTIFY DEPENDENCY DATA REPRESENTING ONE OR MORE DEPENDENCIES OF THE SEGMENT DATA ASSOCIATED WITH EACH IDENTIFIED OPERATOR OPERATION 218, parser operations determine whether there are any substrings on the right of "box" that can be such modifiers, e.g. numbers. In this embodiment, the determine is positive, in that "1,2,4,7" are numeric expressions which follow the token "box."

In one embodiment, process operations proceed to build the phrase headed by noun "box". In one embodiment, an intermediate Input structure as the phrase is being built is [box 1,2,4, or 7].

In one embodiment, at IDENTIFY EACH OPERATOR WITHIN THE SEGMENT OPERATION 216, the parser proceeds one more token to the right, and encounters the token "Enter." Retrieving lexical information regarding the token "Enter," the parser determines that "Enter" is a verb and is often accompanied by object phrases. The next token is parsed in an attempt to see if that next token can satisfy the object argument for the token "Enter." A determination is made by the parser that yes, the next token is a dollar amount, and can satisfy the object argument for the token "Enter." Building this phrase results in [Enter $5000].

In this exemplary embodiment, at DISCARD OR OTHERWISE IGNORE, FOR THE PURPOSES OF THIS ANALYSIS, ANY TOKENS NOT IDENTIFIED AS EITHER AN OPERATOR OR A DEPENDENCY OPERATION 220, there are no tokens that have not been identified either as an operator or an argument associated with an operator.

In one embodiment, at APPLY ONE OR MORE OPERATOR-SPECIFIC RULES TO EACH IDENTIFIED OPERATOR OF THE SEGMENT DATA TO DETERMINE A FIRST PREDICATE STRUCTURE EQUIVALENT TO THE ORIGINAL NATURAL LANGUAGE TEXT OF THE SEGMENT OPERATION 222, for each of the built phrases above, transformations are applied to determine and provide structured output. Using an operator rule associated with "box", the phrase [box 1,2,4, or 7] is transformed to (or(box (1),box(2),box(4),box(7))). Correspondingly, using an operator rule associated with the operator "enter," the phrase [Enter $5000] is transformed to (5000). A larger structured unit is then built according to additional rules regarding structures, where order is considered, among other things, resulting in (or(box(1),box(2),box(4),box(7))),(5000).

To complete the structure building, in one embodiment, the nature of each constituent of the sentence from which the segment was derived is examined, to determine whether the any segment of the sentence preceding the segment is an abbreviated conditional, for example. In this case, the previous segment of the sentence was parsed, resulting in the PAS "if checked (in part I)."

That PAS and the PAS of the most recent transformation are combined, resulting in (if(or(not_blank(box(1),box(2), box(4),box(7))))),(then(5000)). Other transformations are possible, and will be able to be determined by persons of skill in the art having the benefit of this disclosure.

In addition to parsing operations provided above, other possible parsing processes may also be employed, to provide a rich environment for converting natural language text into machine-executable functions.

In one embodiment, a second parsing process includes receiving electronic textual data including instructions to determine one or more form field values of one or more forms of the plurality of forms. The method further includes, in one embodiment, analyzing the electronic textual data to determine sentence data representing separate sentences of the electronic textual data, and separating the electronic textual data into the determined separate sentences. Further, in one embodiment, for each sentence, extracting, for each given sentence of sentence data representing sentences in the data array, operand data representing one or more extracted operands of the sentence, and determining sentence fragment data for parts of speech for sentence fragments of the sentence including sentence fragment data representing word groups forming one or more parts of speech. Then, in one embodiment, separating sentence fragment data of the sentence containing verbs and sentence fragment data containing "if" or "minus" where the associated part of speech is either a prepositional phrase or a clause introduced by a subordinating conjunction, resulting in separated sentence fragment data.

Further, in one embodiment, for each token present in sentence data, removing any word present in exclusion data, filtering the sentence data to keep only tokens meeting at least one token test, and combining the filtered token data and the separated sentence fragment data and eliminating sentence fragments containing words from the exclusion data representing a predetermined exclusion list, resulting in filtered sentence fragment data. Finally, in one embodiment, replacing, within sentences of the data array, all single-word sentence fragments of the filtered sentence fragment data having similar meanings with a single word and extracting text-readable functions from sentences of the data array by matching predetermined patterns and replacing matched patterns with function data representing text-readable functions, converting the function data to computer readable functions, and implementing one or more of the computer readable functions in a document preparation system such as a tax preparation system. Additional details relating to process operations of a computing system implemented method for learning and incorporating forms in an electronic document preparation system will be discussed below.

Figure 3:
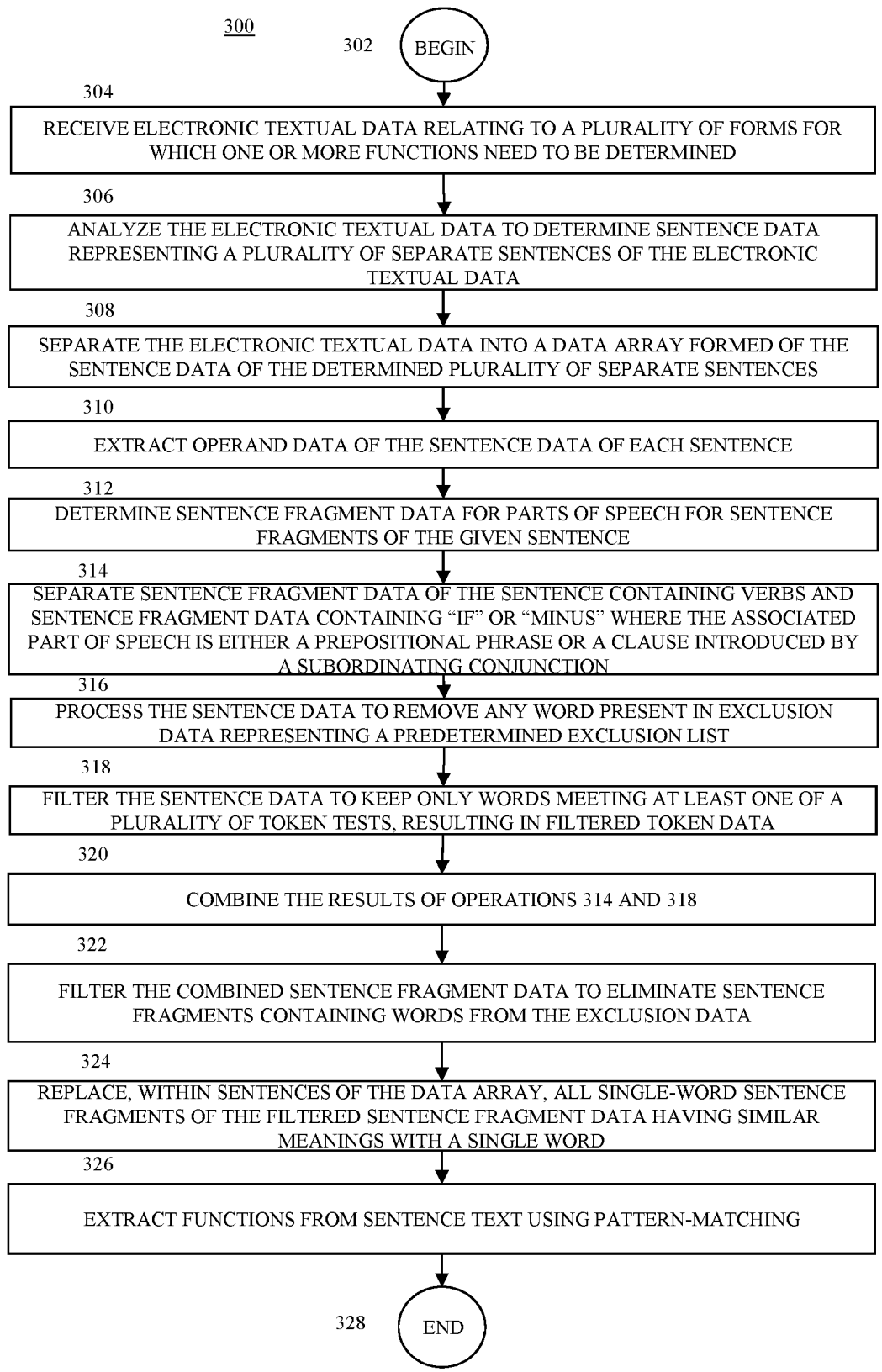
FIG. 3 is a flow diagram of a process for transforming natural language text into machine-executable functions in an electronic document preparation system, in accordance with one embodiment.

FIG. 3 is a flow diagram of a process for transforming natural language text into machine-executable functions in an electronic document preparation system, in accordance with one embodiment.

Referring to FIG. 1 and FIG. 3 together, process 300 for transforming natural language text into machine-executable functions in an electronic document preparation system starts with BEGIN OPERATION 302 and process flow proceeds with RECEIVE ELECTRONIC TEXTUAL DATA RELATING TO A PLURALITY OF FORMS FOR WHICH ONE OR MORE FUNCTIONS NEED TO BE DETERMINED OPERATION 304.

In one embodiment, at RECEIVE ELECTRONIC TEXTUAL DATA RELATING TO A PLURALITY OF FORMS FOR WHICH ONE OR MORE FUNCTIONS NEED TO BE DETERMINED OPERATION 304, interface module 112 is configured to receive form data 119 related to a new and/or updated form. Interface module 112 can receive the form data 119 from an expert, from a government agency, from a financial institution, or in other ways now known or later developed. In various embodiments, form data 119 originates as one or more physical printed pages or electronic equivalents of actual form data relating to the physical form, such as an instruction booklet or other documentation, to electronic textual data. For example, the form data 119 may include textual line descriptions and/or form text for various data fields of the new and/or updated form. The textual line descriptions and form text originate from one or more different sources, such as, in the case of the new and/or updated U.S. tax form, from the Internal Revenue Service (IRS). The textual line descriptions and form text include, in one embodiment, text of one or more actual tax forms issued by the IRS and required to be filled out by taxpayers for which the new and/or updated form applies. The textual line descriptions and form text further include, in one embodiment, text of one or more instruction sets and publications issued by the IRS to assist the tax payer or tax preparer properly complete the form. The natural language parsing module 115 analyzes, in one embodiment, these textual line descriptions through process described herein and generates natural language parsing data 118 indicating the type of data value expected in each data field, among other things.

In one embodiment, form data 119 relates to specific subsections of a given new or updated form, such as form text and/or form data of or relating to one or more form fields of the new or updated form, such as changed sections of the form from a prior version. In one embodiment, at RECEIVE ELECTRONIC TEXTUAL DATA RELATING TO A PLURALITY OF FORMS FOR WHICH ONE OR MORE FUNCTIONS NEED TO BE DETERMINED OPERATION 304, form data 119 originates as one or more portions or components of physical forms such as paper forms which are scanned or otherwise converted through optical character recognition or other known or later developed methods from physical form to electronic textual data of form data 119. In one embodiment, the electronic textual data relating to portions of or the entirety of the new or updated form is collected into an electronic text corpus including all of the acquired and converted text data and stored as at least a portion of form data 119.

In one embodiment, following completion of RECEIVE ELECTRONIC TEXTUAL DATA RELATING TO A PLURALITY OF FORMS FOR WHICH ONE OR MORE FUNCTIONS NEED TO BE DETERMINED OPERATION 304, process flow proceeds with ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 306.

In one embodiment, at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 306, the electronic text corpus of form data 119 formed at RECEIVE ELECTRONIC TEXTUAL DATA RELATING TO A PLURALITY OF FORMS FOR WHICH ONE OR MORE FUNCTIONS NEED TO BE DETERMINED OPERATION 304 is analyzed to determine individual sentences of the electronic text corpus and to separate sentence data representing those individual sentences into a data array whose array members are the individual sentences of the electronic text corpus. In one embodiment, the sentences of the electronic text corpus are not formed as individual members of a data array, but rather are processed individually, thus processing sentence data representing each individual sentence according to one or more of the process operations discussed herein.

In one embodiment, following the electronic text corpus of RECEIVE ELECTRONIC TEXTUAL DATA RELATING TO A PLURALITY OF FORMS FOR WHICH ONE OR MORE FUNCTIONS NEED TO BE DETERMINED OPERATION 304 being analyzed and separated into sentences at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 306, process flow proceeds with SEPARATE THE ELECTRONIC TEXTUAL DATA INTO A DATA ARRAY FORMED OF THE SENTENCE DATA OF THE DETERMINED PLURALITY OF SEPARATE SENTENCES OPERATION 308 where the electronic textual data analyzed at ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 306 is separated into a data array formed of individual sentence data items, each data item of the data array representing a different sentence of the text corpus. In one embodiment, following the electronic textual data being separated into a data array formed of individual sentence data items, each data item of the data array representing a different sentence of the text corpus at SEPARATE THE ELECTRONIC TEXTUAL DATA INTO A DATA ARRAY FORMED OF THE SENTENCE DATA OF THE DETERMINED PLURALITY OF SEPARATE SENTENCES OPERATION 308, process flow proceeds with EXTRACT OPERAND DATA OF THE SENTENCE DATA OF EACH SENTENCE OPERATION 310.

In one embodiment, at EXTRACT OPERAND DATA OF THE SENTENCE DATA OF EACH SENTENCE OPERATION 310, operand data is extracted from each sentence being processed, and tracked so that extracted operands are attributed or otherwise tagged as having originated in a particular sentence.

In one embodiment, an operand is a sentence fragment that is operated on by an operator. Operators can include arithmetic operators such as addition, subtraction, multiplication, or division operators; logical operators such as if-then operators; existence condition operators that depend on the existence of a dependency such as a data value in another data field of new and/or updated form, in a form other than the new and/or updated form, or in some other location or data set; and string comparisons including greater than, less than and equal to, among others.

For example, if a sentence being analyzed is "combine line 1 of form 2441 with line 6 of form 2441, the operator is "combine" and the operand s, which are also dependencies, are "line 1 form 2441" and "line 6 form 2441." In one embodiment, an operator is a verb, and operates on a dependency or constant. As explained herein, dependencies can include one or more data values from other data fields of the new and/or updated form, one or more data values from another related form or worksheet, one or more constants, or many other kinds of possible dependencies that can be included in an acceptable machine-executable function for a particular data field.

In one embodiment, following operand data of the sentence data for each sentence of the data array being extracted, or alternatively following the extraction of operands of individual sentences being processed one at a time according to ANALYZE THE ELECTRONIC TEXTUAL DATA TO DETERMINE SENTENCE DATA REPRESENTING A PLURALITY OF SEPARATE SENTENCES OF THE ELECTRONIC TEXTUAL DATA OPERATION 306, process flow proceeds with DETERMINE SENTENCE FRAGMENT DATA FOR PARTS OF SPEECH FOR SENTENCE FRAGMENTS OF THE GIVEN SENTENCE OPERATION 312.

In one embodiment, at DETERMINE SENTENCE FRAGMENT DATA FOR PARTS OF SPEECH FOR SENTENCE FRAGMENTS OF THE GIVEN SENTENCE OPERATION 312, for each sentence being processed, the sentence is analyzed and different parts of speech are identified. Optionally, short phrases are also identified, in one embodiment. Parts of speech data representing which part of speech was identified and which words of the sentence forms that part of speech are tracked and stored in sentence fragment data. One or more of nouns, verbs, prepositional phrases, subordinating conjunctions, or any other parts of speech now known or later developed are parts of speech that may be identified herein, in various embodiments.

In one embodiment, following the analysis of sentences being processed to identify parts of speech and store data regarding which parts of speech were identified and which sentence fragments are associated with those stored parts of speech at DETERMINE SENTENCE FRAGMENT DATA FOR PARTS OF SPEECH FOR SENTENCE FRAGMENTS OF THE GIVEN SENTENCE OPERATION 312, process flow proceeds with SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314.

In one embodiment, at SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314, sentence fragment data of DETERMINE SENTENCE FRAGMENT DATA FOR PARTS OF SPEECH FOR SENTENCE FRAGMENTS OF THE GIVEN SENTENCE OPERATION 312 is analyzed according to the previously determined parts of speech associated with various portions of the sentence being processed, and sentence fragment data that contain verbs are isolated from the remainder of the sentence fragments not containing verbs. Further, in one embodiment, the remainder of the sentence fragment data, e.g. sentence fragment data representing sentence fragments not containing verbs, are further analyzed to determine whether the remainder of the sentence fragment data includes one or more sentence fragments contain "if" or "minus" and have an associated part of speech that has been identified as a prepositional phrase or a clause introduced by a subordinating conjunction. If a determination is made that one or more sentence fragments contain "if" or "minus" and have an associated part of speech that has been identified as a prepositional phrase or a clause introduced by a subordinating conjunction, sentence fragments data representing those sentence fragments are combined with the sentence fragment data that contain verbs, resulting in final sentence fragment data. In one embodiment, sentence fragment data that is not a part of final sentence fragment data is discarded.

In one example, in a sentence "Do not enter more than $5000," sentence fragments "Do not enter" and "more than $5000" would be identified. Since "enter" is a verb, the sentence fragment "Do not enter" would be kept, while the remaining sentence fragment "more than $5000" would be discarded or otherwise not used in further processing operations.

In one embodiment, a first set of process operations to determine a set of operators present in a given sentence has been described above, and a second set of operations to determine a set of operators present in a given sentence is described below. Results from the two different sets of operations will be combined and processed further to determine a final set of operators.

In one embodiment, following completion of the analysis according to the previously determined parts of speech associated with various portions of the sentence being processed, and the separation of sentence fragment data that contain verbs from the remainder of the sentence fragments not containing verbs and the isolation of the remainder of the sentence fragment data including one or more sentence fragments contain "if" or "minus" and have an associated part of speech that has been identified as a prepositional phrase or a clause introduced by a subordinating conjunction at SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314, process flow proceeds with PROCESS THE SENTENCE DATA TO REMOVE ANY WORD PRESENT IN EXCLUSION DATA REPRESENTING A PREDETERMINED EXCLUSION LIST OPERATION 316.

In one embodiment, at PROCESS THE SENTENCE DATA TO REMOVE ANY WORD PRESENT IN EXCLUSION DATA REPRESENTING A PREDETERMINED EXCLUSION LIST OPERATION 316, sentence data of SEPARATE THE ELECTRONIC TEXTUAL DATA INTO A DATA ARRAY FORMED OF THE SENTENCE DATA OF THE DETERMINED PLURALITY OF SEPARATE SENTENCES OPERATION 308 is analyzed and processed to remove any words found on an exclusion list. In one embodiment, the exclusion list is predetermined and contains inconsequential or less important words according to the genre of the text corpus. In one embodiment, the exclusion list is prepared by a third party and retrieved by electronic document preparation system 111.

In one embodiment, following processing of the sentence data of SEPARATE THE ELECTRONIC TEXTUAL DATA INTO A DATA ARRAY FORMED OF THE SENTENCE DATA OF THE DETERMINED PLURALITY OF SEPARATE SENTENCES OPERATION 308 at PROCESS THE SENTENCE DATA TO REMOVE ANY WORD PRESENT IN EXCLUSION DATA REPRESENTING A PREDETERMINED EXCLUSION LIST OPERATION 316, process flow proceeds with FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318.

In one embodiment, at FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318, the results of PROCESS THE SENTENCE DATA TO REMOVE ANY WORD PRESENT IN EXCLUSION DATA REPRESENTING A PREDETERMINED EXCLUSION LIST OPERATION 316 are further processed to discard or otherwise remove from further processing any sentence data that fails a series of token tests, thus keeping all words of the sentence data of PROCESS THE SENTENCE DATA TO REMOVE ANY WORD PRESENT IN EXCLUSION DATA REPRESENTING A PREDETERMINED EXCLUSION LIST OPERATION 316 that meet at least one of the token tests.

In one embodiment, the token tests of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318 include determining a part of speech of each word of the sentence being processed to determine whether the word is a verb. If the word is a verb, it is marked as satisfying at least one of the token tests, and is thus kept for further processing.

In one embodiment, the token tests of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318 include determining a part of speech of each word of the sentence being processed to determine whether the word is an adjective superlative. If the word is an adjective superlative, it is marked as satisfying at least one of the token tests, and is thus kept for further processing.

In one embodiment, the token tests of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318 include determining a part of speech of each word of the sentence being processed to determine whether the word is an adjective comparative. If the word is an adjective comparative, it is marked as satisfying at least one of the token tests, and is thus kept for further processing.

In one embodiment, the token tests of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318 include determining whether the word being considered is "divide" and whether a part of speech of the word being considered is a noun. If the word being considered is "divide" and its part of speech is noun, the word is marked as satisfying at least one of the token tests, and is thus kept for further processing.

In one embodiment, the token tests of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318 include determining whether the word being considered is not within final sentence fragment data of SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314. If the word being considered is within any sentence fragment of SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314, the word is discarded for this step, but still remains within the final fragment data.

In one embodiment, following the filtering of sentence data to keep only words meeting one or more token tests at FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318, process flow proceeds with COMBINE THE RESULTS OF OPERATIONS 314 AND 318 OPERATION 320.

In one embodiment, at COMBINE THE RESULTS OF OPERATIONS 314 AND 318 OPERATION 320, the final sentence fragment data resulting from the performance of SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314 is combined with the final fragment data resulting from the performance of FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318.

In one embodiment, following combining the results of the process operations SEPARATE SENTENCE FRAGMENT DATA OF THE SENTENCE CONTAINING VERBS AND SENTENCE FRAGMENT DATA CONTAINING "IF" OR "MINUS" WHERE THE ASSOCIATED PART OF SPEECH IS EITHER A PREPOSITIONAL PHRASE OR A CLAUSE INTRODUCED BY A SUBORDINATING CONJUNCTION OPERATION 314 and FILTER THE SENTENCE DATA TO KEEP ONLY WORDS MEETING AT LEAST ONE OF A PLURALITY OF TOKEN TESTS, RESULTING IN FILTERED TOKEN DATA OPERATION 318, process flow proceeds with FILTER THE COMBINED SENTENCE FRAGMENT DATA TO ELIMINATE SENTENCE FRAGMENTS CONTAINING WORDS FROM THE EXCLUSION DATA 322. In one embodiment, FILTER THE COMBINED SENTENCE FRAGMENT DATA TO ELIMINATE SENTENCE FRAGMENTS CONTAINING WORDS FROM THE EXCLUSION DATA 322 may be performed instead of PROCESS THE SENTENCE DATA TO REMOVE ANY WORD PRESENT IN EXCLUSION DATA REPRESENTING A PREDETERMINED EXCLUSION LIST OPERATION 316 because FILTER THE COMBINED SENTENCE FRAGMENT DATA TO ELIMINATE SENTENCE FRAGMENTS CONTAINING WORDS FROM THE EXCLUSION DATA 322 is performed on the combined results of two different prior operations. However, processing sentence data to exclude sentence fragment data that appears on an exclusion list may be performed at any time, or multiple times, depending on circumstances, so long as when it is performed and the sentence fragment data that results doesn't have any words or phrases of the exclusion list present.

In one embodiment, following the exclusion of words of the exclusion list from the combined results, process flow proceeds with REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD.

In one embodiment, at REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324, synonyms of operators in the original data array of sentences are replaced with a common word, thus simplifying the vocabulary in use.

For example, "add" and "combine" are both synonyms and "combine" is thus replaced, in one embodiment, with a one word synonym "add." Correspondingly, in one embodiment, "smaller," lowest,", and "minimum" are all synonyms, and "smaller" and "lowest" are replaced with "minimum." It could just as easily been "lower" and "minimum" being replaced with "smaller," or "smaller" and "minimum" being replaced with "lowest."

In one embodiment, following the completion of REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324, process flow proceeds with EXTRACT FUNCTIONS FROM SENTENCE TEXT USING PATTERN-MATCHING OPERATION 326.

In one embodiment, at EXTRACT FUNCTIONS FROM SENTENCE TEXT USING PATTERN-MATCHING OPERATION 326, the results of REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324 are processed through a pattern-matching algorithm where the sentence text having common operators are examined to determine whether the sentence text matches a predetermined pattern, and if so, replacing the format of the sentence text with a predetermined matching function.

In an example which combines REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324 and EXTRACT FUNCTIONS FROM SENTENCE TEXT USING PATTERN-MATCHING OPERATION 326, the results of REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324, if the sentence text being analyzed is "combine line 1 of form 2441 with line 3 of form 2441. In this example, dependencies would have previously been determined to be "line 1 of form 2441" and "line 3 of form 2441." The word "with would have been removed, perhaps as being on the exclusion list, or by not passing the token tests. The word "combine" is an operator, e.g. it operates on one or more dependencies or other operands, and would possible be replaced, at REPLACE, WITHIN SENTENCES OF THE DATA ARRAY, ALL SINGLE-WORD SENTENCE FRAGMENTS OF THE FILTERED SENTENCE FRAGMENT DATA HAVING SIMILAR MEANINGS WITH A SINGLE WORD OPERATION 324 with "add," resulting in the sentence now reading "add" "line 1 of form 2441" "line 3 of form 2441." At EXTRACT FUNCTIONS FROM SENTENCE TEXT USING PATTERN-MATCHING OPERATION 326, an exemplary pattern is, in one embodiment, "add"[dependency1][dependency2] which would match "add" "line 1 of form 2441" and "line 3 of form 2441." Once the pattern is matched, the sentence text is replaced with a computer-executable function for the form field value, where the computer executable function represents the human-readable equation "line 1 of form 2441"+"line 3 of form 2441.

In one embodiment, at, or prior to, EXTRACT FUNCTIONS FROM SENTENCE TEXT USING PATTERN-MATCHING OPERATION 326, patterns are developed through a process which includes an analysis of the text corpus.

In one embodiment, a determination is made as to sentence structure of lines of the text corpus that include operators and which therefore also likely need to be converted to computer executable functions.

In one embodiment, structure descriptors are defined, and equivalents to each structure descriptor are defined. For example, a structure descriptor "operator_key" is defined, and add, subtract, multiply, and divide are members of a set of operators associated with that structure descriptor.

In various embodiments, structure descriptors are defined, and one or more of "constant_key," which designates that a known constant is being used, "logical_key," which designates that a known logical operator is being used, "delimiter key," which indicates the presence of punctuation, and "number" which indicates the presence of a number, are employed.

A useful notation to use when employing the process operations discussed herein is Structure descriptor (key1, key2, key3, key4 . . . ) where key1, key2, key3, and key4 are tokens/words symbols expressed in the corpus that meet the definition of the particular structure descriptor.

In various embodiments, using the notation above, the structure descriptors and associated keys include one or more of operator_key (add, subtract, multiply, divide)
constant_key (line, lines, ln)
number (1,2,3,4,5,6,7,8,9,0)
logical_key (and, or, from, by) and
delimiter key(.\,\) where the punctuation item is offset by a forward slash.

An optional next process operation in determining patterns to be converted to executable/machine code is to determine a frequency of patterns appearing in the text corpus. In one embodiment, patterns are determined for each line of the text corpus that is associated with a form field value of a form in the document preparation system. In one embodiment, patterns are determined only for a subset of lines of the text corpus having sentence structures that appear with a frequency that exceeds a predetermined threshold.

In one embodiment, a sentence structure is determined by mapping and replacing each key in the line or sentence, for example, with the appropriate structure designator. In one example, using the structure designators defined above and using the keys associated with each of the structure designators shown above, a line of the text corpus that has been processed to remove words on an exclusion list, such as is done at PROCESS THE SENTENCE DATA TO REMOVE ANY WORD PRESENT IN EXCLUSION DATA REPRESENTING A PREDETERMINED EXCLUSION LIST OPERATION 316, appears as add line 1 and line 2

(where line 1 and line 2 are form field values of the form being processed). Since "add" appears as being associated with the structure designator "operator_key," that key is replaced with "operator_key." Correspondingly, "line" appears as a key of the structure designator "constant_key," and thus is replaced with "constant_key." The remaining terms/keys of the line are correspondingly replaced with the associated structure designators, thus resulting on a new pattern construct operator_key  constant_key  number  logical_key constant_key number which represents the pattern construct of the line "add line 1 and line 2." Note, for example, that in our example, the structure designator "operator_key" includes keys "add," "subtract," "multiply," and "divide." It follows, therefore, that the lines "add line 1 and line 2," "subtract line 1 from line 2" "multiply line 1 and line 2" "divide line 1 by line 2" will all have the same pattern construct "operator_key constant_key number logical_key constant_key number."

In one embodiment, once all pattern constructs for all lines of a form being processed that have field values associated therewith are determined, a frequency of appearance of each pattern construct is determined, and the pattern constructs appearing with a frequency greater than a predetermined threshold are identified and marked or otherwise isolated or set aside for pattern generation.

In one embodiment, after sorting the pattern constructs by frequency of appearance, only the top thirty pattern constructs are marked or otherwise isolated or set aside for pattern generation. In one embodiment, after sorting the pattern constructs by frequency of appearance, only the top ten percent of highest frequency pattern constructs are marked or otherwise isolated or set aside for pattern generation. Other thresholds will be obviously to those of ordinary skill, and well within the teachings of the process operations described herein.

In one embodiment, patterns are developed for each of the highest frequency pattern constructs, and are then formed as rules for converting various lines of the text corpus into an intermediate form that can then be converted into computer executable instructions representing functionality that performs the operations specified in the line, e.g. add lines 1 and 2.

Using a rule similar to

```
{
    ruleType: "tokens",
        pattern: ( (/add/ || /combine/) /lines/ (/(.)/ || /(\d+)/ ||
/(\d+.)/ ) /and/ (/(.)/ || /(\d+)/ || /(\d+.)/ )),
            result: ("LINE",$0[2],"AND","LINE",$0[4])
}
``` for example, a processed line reading "add lines 1 and 2" would be matched by the pattern and converted thereby to an intermediate functional form add(line1, line2)

which can then be mapped to a computing processor executable function of the same form. Note that the pattern also matches a line reciting "combine lines [x] and [y]" where X and y are the numbers of the lines to be added or otherwise combined.

Persons of ordinary skill in the art will readily appreciate that many different patterns may be developed which map to functional forms which can then be mapped to computing processor executable functions.

In one embodiment, following the extraction of functions from sentence text through pattern-matching at EXTRACT FUNCTIONS FROM SENTENCE TEXT USING PATTERN-MATCHING OPERATION 326, the extracted function may be tested as discussed herein and then incorporated into the electronic document preparation system using process operations described herein, assuming that the function passes the tests or is otherwise deemed the best function developed for a given form field, as compared with functions determined using other methods discussed herein. In one embodiment, following the extraction of functions from sentence text through pattern-matching at EXTRACT FUNCTIONS FROM SENTENCE TEXT USING PATTERN-MATCHING OPERATION 326, process flow proceeds with END OPERATION 328 where the process ends awaiting further input.

As noted above, the specific illustrative examples discussed above are but illustrative examples of implementations of embodiments of a computing system implemented method for learning and incorporating forms in an electronic document preparation system. Persons of skill in the art will readily recognize that other implementations and embodiments are possible. Therefore, the discussion above should not be construed as a limitation on the claims provided herein.

In one embodiment, a computing system implements a method for transforming natural language text into machine-executable functions in an electronic document preparation system. The method includes receiving electronic textual data including instructions to determine one or more form field values of one or more forms of the plurality of forms. The method further includes, in one embodiment, analyzing the electronic textual data to determine sentence data representing separate sentences of the electronic textual data, and separating the electronic textual data into the determined separate sentences. Further, in one embodiment, for each sentence, extracting, for each given sentence of sentence data representing sentences in the data array, operand data representing one or more extracted operands of the sentence, and determining sentence fragment data for parts of speech for sentence fragments of the sentence including sentence fragment data representing word groups forming one or more parts of speech. Then, in one embodiment, separating sentence fragment data of the sentence containing verbs and sentence fragment data containing "if" or "minus" where the associated part of speech is either a prepositional phrase or a clause introduced by a subordinating conjunction, resulting in separated sentence fragment data.

Further, in one embodiment, for each token present in sentence data, removing any word present in exclusion data, filtering the sentence data to keep only tokens meeting at least one token test, and combining the filtered token data and the separated sentence fragment data and eliminating sentence fragments containing words from the exclusion data representing a predetermined exclusion list, resulting in filtered sentence fragment data. Finally, in one embodiment, replacing, within sentences of the data array, all single-word sentence fragments of the filtered sentence fragment data having similar meanings with a single word and extracting text-readable functions from sentences of the data array by matching predetermined patterns and replacing matched patterns with function data representing text-readable functions, converting the function data to computer readable functions, and implementing one or more of the computer readable functions in a document preparation system such as a tax preparation system.

In one embodiment, a non-transitory computer-readable medium has a plurality of computer-executable instructions which, when executed by a processor, perform a method for transforming natural language text into machine-executable functions in an electronic document preparation system as described herein.

One embodiment is a computing system implemented method for transforming natural language text into machine-executable functions in an electronic document preparation system. The method includes receiving form data related to a new and/or updated form having a plurality of data fields, gathering training set data related to previously filled forms. Each previously filled form has completed data fields that each correspond to a respective data field of the new and/or updated form. The method also includes generating, for a first selected data field of the plurality of data fields of the new and/or updated form, dependency data indicating one or more possible dependencies for an acceptable machine-executable function that provides a proper data value for the first selected data field. The method further includes generating, for the first selected data field, candidate machine-executable function data including a plurality of candidate machine-executable functions based on the dependency data and one or more operators selected from a library of operators, generating, for each candidate machine-executable function, test data by applying the candidate machine-executable function to the training set data, and generating, for each candidate machine-executable function, matching data by comparing the test data to the completed data fields corresponding to the first selected data field, the matching data indicating how closely the test data matches the corresponding completed data fields of the previously filled forms. The method also includes identifying, from the plurality of functions, an acceptable candidate machine-executable function for the first selected data field of the new and/or updated form by determining, for each candidate machine-executable function, whether or not the candidate machine-executable function is an acceptable machine-executable function for the first selected data field of the new and/or updated form based on the matching data, generating, after identifying an acceptable machine-executable function for the first data field, results data indicating an acceptable for the first data field of the new and/or updated form, and outputting the results data.

One embodiment is a system for transforming natural language text into machine-executable functions in an electronic document preparation system. The system includes at least one processor at least one memory coupled to the at least one processor. The at least one memory has stored therein instructions which, when executed by any set of the one or more processors, perform one or more processes described herein. The process includes, in one embodiment, receiving, with an interface module of a computing system, form data related to a new and/or updated form having a plurality of data fields, gathering, with a data acquisition module of a computing system, training set data related to previously filled forms. Each previously filled form has completed data fields that each correspond to a respective data field of the new and/or updated form. The process also includes generating, with a machine learning module of a computing system, for a first selected data field of the plurality of data fields of the new and/or updated form, dependency data indicating one or more possible dependencies for an acceptable machine-executable function that provides a proper data value for the first selected data field. The process also includes generating, with the machine learning module, for the first selected data field, candidate machine-executable function data including a plurality of candidate machine-executable functions based on the dependency data and one or more operators selected from a library of operators, generating, with the machine learning module, for each candidate machine-executable function, test data by applying the candidate machine-executable function to the training set data, and generating, with the machine learning module, for each candidate machine-executable function, matching data by comparing the test data to the completed data fields corresponding to the first selected data field, the matching data indicating how closely the test data matches the corresponding completed data fields of the previously filled forms. The process also includes identifying, with the machine learning module, from the plurality of functions, an acceptable candidate machine-executable function for the first selected data field of the new and/or updated form by determining, for each candidate machine-executable function, whether or not the candidate machine-executable function is an acceptable machine-executable function for the first selected data field of the new and/or updated form based on the matching data, generating, with the machine learning module and after identifying the correct function for the first data field, results data indicating an acceptable machine-executable function for the first data field of the new and/or updated form, and outputting, with the interface module, the results data.

Using the disclosed embodiments of a method and system for transforming natural language text into machine-executable functions in an electronic document preparation system, a method and system for transforming natural language text into machine-executable functions in an electronic document preparation system more accurately is provided. Therefore, the disclosed embodiments provide a technical solution to the long standing technical problem of efficiently transforming natural language text into machine-executable functions in an electronic document preparation system.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer implemented method, comprising:
receiving electronic textual data relating to a form for which one or more machine-executable form field functions needs to be determined, the electronic textual data including natural language instructions relating to the determination of one or more form field values of the form;
analyzing the electronic textual data to determine sentence data representing a plurality of separate sentences of the electronic textual data;
separating the electronic textual data into a data array formed of the sentence data of the determined plurality of separate sentences;
for each given sentence of sentence data representing sentences in the data array:
isolating segment data of one or more segments of the sentence data while relating each resulting segment to prior and succeeding segments of the sentence data, further storing the isolated segment data in one or more segment data memory locations organized to retain structure and relation of one segment to another;
for each segment of the segment data:
classifying segment data of each segment as being of a segment type of a plurality of possible segment types, discarding segment data classified as being of one or more particular predetermined segment types; and
parsing each segment data according to one or more predetermined lexicons and determining whether the segment contains one or more operators, an operator being a natural language token representing an operation that may be performed on data;
upon determining that the segment data representing the segment contains operator data representing one or more operators:
identifying all operators in the segment data representing the segment;
identifying dependency data representing one or more dependencies of the segment data associated with each identified operator;
discarding any tokens not identified as either an operator or a dependency; and
applying one or more operator-specific rules to each identified operator of the segment data to determine a first predicate structure equivalent to the original natural language text of the segment; and
upon determining that the segment data representing the segment does not contain operator data representing one or more operators:
identifying each single or multiword token in the segment data that is a predetermined token of the domain;
determining any remaining tokens of the segment that are not predetermined tokens of the domain and map the identified tokens and the remaining tokens to one or more predetermined rules, resulting in a first predicate structure for the segment data of the segment being analyzed;
mapping one or more of the first predicate structures to one or more predetermined machine-executable functions; and implementing at least one of the mapped machine-executable functions in an electronic document preparation system.

2. The computer implemented method of claim 1, further comprising:
determining one or more single or multiword tokens in a segment that are a subset of a longer multiword token; and
eliminating from consideration, for this segment, the determined single or multiword tokens.

3. The computer implemented method of claim 1, further comprising:
removing, from a segment being processed, one or more tokens of the segment from further consideration due to the one or more tokens appearing in exclusion data representing an exclusion list.

4. The computer implemented method of claim 3, wherein the exclusion list includes words known to have little or no importance in the domain of the data array.

5. The computer implemented method of claim 1, wherein an operator includes a natural language token specified as or is a synonym of one of a set of operators comprising:
add;
subtract;
multiply;
divide;
less than;
greater than;
and;
or;
equal to; and
not equal to.

6. The computer implemented method of claim 1, wherein the segment types include at least one segment type selected from the group of segment types consisting of:
description;
amount;
instructions;
condition;
date;
person status; and
true calc.

7. The computer implemented method of claim 1, further comprising:
filtering the sentence data to keep only tokens meeting at least one of a plurality of token tests, resulting in filtered token data.

8. The computer implemented method of claim 7, wherein filtering the sentence data to keep only tokens meeting at least one of a plurality of token tests further comprises:
determining a part of speech of the token; and
filtering the sentence data to keep only tokens having particular predetermined parts of speech characteristics, resulting in filtered token data.

9. The computer implemented method of claim 8, wherein filtering the sentence data to keep only tokens having particular predetermined parts of speech characteristics, resulting in filtered token data further comprises:
keeping a token of the sentence data if a part of speech associated with the token is a noun.

10. The computer implemented method of claim 8, wherein filtering the sentence data to keep only tokens having particular predetermined parts of speech characteristics, resulting in filtered token data further comprises:
keeping a token of the sentence data if a part of speech associated with the token is a verb.

11. The computer implemented method of claim 1, further comprising:
predetermining a lexicon by:
determining a frequency of appearance of one or more tokens with respect to all other tokens in a text corpus of the domain;
discarding from the text corpus any tokens having a frequency of appearance below a predetermined threshold frequency, resulting in remaining tokens;
examining each remaining token of the sentence data in a context of a sentence of the sentence data in which the token appears; and
identifying a part of speech associated with the use of the remaining token in the context of its use within segments in which it appears.

12. The computer implemented method of claim 1, further comprising:
replacing, within one or more sentences of the data array, tokens having similar meanings with a single word synonym of the original token.

13. The computer implemented method of claim 1, further comprising:
generating, for a first data field of at least a first sentence of the data array, dependency data indicating one or more dependencies, wherein the dependencies include one or more of:
a data value of a second data field from a second sentence of the data array;
a data value of a first data field associated with a sentence of a form other than a form associated with the first data field; and
a constant.

14. The computer implemented method of claim 1, wherein the sentence data of the data array is associated with a new or updated tax form.

15. A system, comprising:
one or more processors;
at least one memory coupled to the one or more processors and storing instructions that, when executed by the one or more processors, cause the system to perform operations comprising:
receiving electronic textual data relating to a form for which one or more machine-executable form field functions needs to be determined, the electronic textual data including natural language instructions relating to the determination of one or more form field values of the form;
analyzing the electronic textual data to determine sentence data representing a plurality of separate sentences of the electronic textual data;
separating the electronic textual data into a data array formed of the sentence data of the determined plurality of separate sentences;
for each given sentence of sentence data representing sentences in the data array:
isolating segment data of one or more segments of the sentence data while relating each resulting segment to prior and succeeding segments of the sentence data, further storing the isolated segment data in one or more segment data memory locations organized to retain structure and relation of one segment to another;
for each segment of the segment data:
classifying segment data of each segment as being of a segment type of a plurality of possible segment types, discarding segment data classified as being of one or more particular predetermined segment types; and parsing each segment data according to one or more predetermined lexicons and determining whether the segment contains one or more operators, an operator being a natural language token representing a mathematical operation;

upon determining that the segment data representing the segment contains operator data representing one or more operators:

identifying all operators in the segment data representing the segment;

identifying dependency data representing one or more dependencies of the segment data associated with each identified operator;

discarding any tokens not identified as either an operator or a dependency; and applying one or more operator-specific rules to each identified operator of the segment data to determine a first predicate structure equivalent to the original natural language text of the segment;

upon determining that the segment data representing the segment does not contain operator data representing one or more operators:

identifying each single or multiword token in the segment data that is a predetermined token of the domain;

determining any remaining tokens of the segment that are not predetermined tokens of the domain and map the identified tokens and the remaining tokens to one or more predetermined rules, resulting in a first predicate structure for the segment data of the segment being analyzed;

mapping one or more of the first predicate structures to one or more predetermined machine-executable functions; and implementing at least one of the mapped machine-executable functions in an electronic document preparation system.

16. The system of claim 15, wherein execution of the instructions causes the system to perform operations further comprising:

determining one or more single or multiword tokens in a segment that are a subset of a longer multiword token; and eliminating from consideration, for this segment, the determined single or multiword tokens.

17. The system of claim 15, wherein execution of the instructions causes the system to perform operations further comprising:

removing, from a segment being processed, one or more tokens of the segment from further consideration due to the one or more tokens appearing in exclusion data representing an exclusion list.

18. The system of claim 17, wherein the exclusion list includes words known to have little or no importance in the domain of the data array.

19. The system of claim 15, wherein an operator includes a natural language token specified as or is a synonym of one of a set of operators comprising:
add;
subtract;
multiply;
divide;
less than;
greater than;
and;
or;
equal to; and
not equal to.

20. The system of claim 15, wherein the segment types include at least one segment type selected from the group of segment types consisting of:
description;
amount;
instructions;
condition;
date;
person status; and
true calc.

21. The system of claim 15, wherein execution of the instructions causes the system to perform operations further comprising:

filtering the sentence data to keep only tokens meeting at least one of a plurality of token tests, resulting in filtered token data.

22. The system of claim 21, wherein filtering the sentence data to keep only tokens meeting at least one of a plurality of token tests further comprises:

determining a part of speech of the token; and filtering the sentence data to keep only tokens having particular predetermined parts of speech characteristics, resulting in filtered token data.

23. The system of claim 22, wherein filtering the sentence data to keep only tokens having particular predetermined parts of speech characteristics, resulting in filtered token data further comprises:

keeping a token of the sentence data if a part of speech associated with the token is a noun.

24. The system of claim 22, wherein filtering the sentence data to keep only tokens having particular predetermined parts of speech characteristics, resulting in filtered token data further comprises:

keeping a token of the sentence data if a part of speech associated with the token is a verb.

25. The system of claim 15, wherein execution of the instructions causes the system to perform operations further comprising:

predetermining a lexicon by:

determining a frequency of appearance of one or more tokens with respect to all other tokens in a text corpus of the domain;

discarding from the text corpus any tokens having a frequency of appearance below a predetermined threshold frequency, resulting in remaining tokens;

examining each remaining token of the sentence data in a context of a sentence of the sentence data in which the token appears; and identifying a part of speech associated with the use of the remaining token in the context of its use within segments in which it appears.

26. The system of claim 15, wherein execution of the instructions causes the system to perform operations further comprising:

replacing, within one or more sentences of the data array, tokens having similar meanings with a single word synonym of the original token.

27. The system of claim 15, wherein execution of the instructions causes the system to perform operations further comprising:

generating, for a first data field of at least a first sentence of the data array, dependency data indicating one or more dependencies, wherein the dependencies include one or more of:
- a data value of a second data field from a second sentence of the data array;
- a data value of a first data field associated with a sentence of a form other than a form associated with the first data field; and
- a constant.

28. The system of claim 15, wherein the sentence data of the data array is associated with a new or updated tax form.

* * * * *